(12) United States Patent
Costa Faidella et al.

(10) Patent No.: US 10,706,141 B2
(45) Date of Patent: Jul. 7, 2020

(54) METHODS AND SYSTEMS FOR IDENTITY CREATION, VERIFICATION AND MANAGEMENT

(71) Applicant: REFINITIV US ORGANIZATION LLC, New York, NY (US)

(72) Inventors: David Costa Faidella, Sidcup (GB); Robert Joseph Schukai, Marietta, GA (US); Scott Ryan Manuel, Durham, NC (US); Marco Pierleoni, Chelmsford (GB); Jason A. Thomas, Arlington, VA (US)

(73) Assignee: REFINITIV US ORGANIZATION LLC, New York, NY (US)

( * ) Notice: Subject to any disclaimer, the term of this patent is extended or adjusted under 35 U.S.C. 154(b) by 0 days.

(21) Appl. No.: 16/225,942

(22) Filed: Dec. 19, 2018

(65) Prior Publication Data
US 2019/0121958 A1 Apr. 25, 2019

Related U.S. Application Data

(63) Continuation of application No. 15/283,993, filed on Oct. 3, 2016, now Pat. No. 10,248,783.
(Continued)

(51) Int. Cl.
*G06F 21/64* (2013.01)
*G06F 21/45* (2013.01)
(Continued)

(52) U.S. Cl.
CPC ............ *G06F 21/45* (2013.01); *G06F 21/645* (2013.01); *H04L 9/3231* (2013.01);
(Continued)

(58) Field of Classification Search
CPC ...... G06F 21/45; H04L 9/3236; H04L 9/3247; H04L 63/08; H04L 63/0861; H04L 63/123
See application file for complete search history.

(56) References Cited

U.S. PATENT DOCUMENTS

| 4,078,152 A | 3/1978 | Tuckerman, III |
| 8,621,642 B2 | 12/2013 | Bjorn et al. |

(Continued)

FOREIGN PATENT DOCUMENTS

| DE | 102013100635 A1 | 7/2014 |
| RU | 2013118462 A | 9/2013 |

(Continued)

OTHER PUBLICATIONS

International Search Report and Written Opinion dated Dec. 28, 2016, of the corresponding International Application PCT/US2016/055215 filed Oct. 3, 2016, 8 pages.
(Continued)

*Primary Examiner* — Paul E Callahan
(74) *Attorney, Agent, or Firm* — Norton Rose Fulbright US LLP

(57) ABSTRACT

An embodiment of a method of providing identity services includes: receiving identity data for an individual for which the identity provider has provided an identity; generating a transaction to store an identifier representing the identity data in a data structure on a blockchain of a distributed system; sending the transaction to at least one node of the distributed system; and generating an identity token incorporating the identifier representing the identity data. An embodiment of a method of verifying an identity includes: receiving data extracted from the identity token, wherein the extracted data includes an identifier representing the identity data; determining whether a data structure containing the extracted identifier representing the identity data is stored on
(Continued)

a blockchain of a distributed system; and outputting an indication of a validity of an identity associated with the identity data based on the determination.

23 Claims, 14 Drawing Sheets

Related U.S. Application Data

(60) Provisional application No. 62/270,658, filed on Dec. 22, 2015.

(51) Int. Cl.
*H04L 9/32* (2006.01)
*H04L 29/06* (2006.01)

(52) U.S. Cl.
CPC .......... *H04L 9/3234* (2013.01); *H04L 9/3236* (2013.01); *H04L 9/3247* (2013.01); *H04L 63/08* (2013.01); *H04L 63/0861* (2013.01); *H04L 63/123* (2013.01); *H04L 2209/38* (2013.01)

(56) References Cited

U.S. PATENT DOCUMENTS

| | | |
|---|---|---|
| 8,838,982 B2 | 9/2014 | Carlson et al. |
| 8,892,697 B2 | 11/2014 | Nema |
| 9,027,105 B1 | 5/2015 | Saylor |
| 9,078,128 B2 | 7/2015 | Medina et al. |
| 9,191,381 B1 | 11/2015 | Popp et al. |
| 9,355,155 B1 | 5/2016 | Cassel et al. |
| 9,703,986 B1 | 7/2017 | Ashley et al. |
| 10,102,526 B1 | 10/2018 | Madisetti et al. |
| 2002/0056043 A1 | 5/2002 | Glass |
| 2005/0201363 A1 | 9/2005 | Gilchrist et al. |
| 2008/0281606 A1 | 11/2008 | Kitts et al. |
| 2009/0147990 A1 | 6/2009 | Lev |
| 2010/0131369 A1 | 5/2010 | Dominguez et al. |
| 2012/0054095 A1 | 3/2012 | Lesandro et al. |
| 2014/0032723 A1 | 1/2014 | Nema |
| 2014/0279641 A1 | 9/2014 | Singh et al. |
| 2015/0046699 A1 | 2/2015 | Benteo et al. |
| 2015/0058950 A1 | 2/2015 | Miu |
| 2015/0222435 A1 | 8/2015 | Lea |
| 2015/0227920 A1 | 8/2015 | Sadiq et al. |
| 2015/0356523 A1 | 12/2015 | Madden |
| 2016/0203575 A1 | 7/2016 | Madhu et al. |
| 2016/0267474 A1 | 9/2016 | Lingham et al. |
| 2016/0328713 A1 | 11/2016 | Ebrahimi |
| 2017/0046651 A1 | 2/2017 | Lin et al. |
| 2017/0111358 A1 | 4/2017 | Hall |
| 2017/0177855 A1* | 6/2017 | Costa Faidella ........ G06F 21/45 |
| 2017/0195336 A1 | 7/2017 | Ouellette |
| 2017/0236121 A1 | 8/2017 | Lyons et al. |
| 2017/0243209 A1 | 8/2017 | Johnsrud et al. |
| 2017/0250972 A1 | 8/2017 | Ronda et al. |

FOREIGN PATENT DOCUMENTS

| | | |
|---|---|---|
| WO | 2014209164 A1 | 12/2014 |
| WO | 2017066002 A1 | 4/2017 |

OTHER PUBLICATIONS

International Search Report and Written Opinion dated May 11, 2017, of the corresponding International Application PCT/US2017/017840 filed Feb. 14, 2017, 9 pages.
Supplementary European Search Report dated Oct. 18, 2018, of the corresponding European Application No. 16879528, 10 pages.
Office Action dated Jun. 4, 2019, issued in the corresponding RU Application No. 2018116448, filed Oct. 3, 2016, 11 pages.
Office Action dated Jul. 1, 2019, issued in the corresponding EP Application No. 16879528.4, filed Oct. 3, 2016, 8 pages.

* cited by examiner

FIG. 21A

Restricted-Access System Interface

QRContent:

MetadataKey To Search: 154

Submit Form

FIG. 21B

Restricted-Access System Interface

QRContent: Hre82ZVC7geovw==]|[0x59a86545feead22d910a00365bea816fa49df267f1c45897f83f5a451e567417]|[241bd845694f8cadb70d90acf66c51e]

MetadataKey To Search:

Submit Form

FIG. 21C

Data extracted from the QR code — 166

IssuerData: PassportAgency|http://thewebsite|http://thewebsite/Pubkey|v:'1.2.3'

Ethereum Tx: [0x59a86545feead22d910a00365bea816fa49df267f1c45897f83f5a451e567417]
Identity Hash: [241bd845694f8cadb70d90acf66c51e]

- Name: Joe — 158
- Middlename:
- Surnames: Smith
- Date Of Birth: 10-1-65
- Place Of Birth: London
- IdentityID: 145009788134

- Cryptovalidation passed: YES! — 161
- Real-Time Identity Status: VALID — 162
- Metadata for key: {}
- Extracted Picture:

Back

METHODS AND SYSTEMS FOR IDENTITY CREATION, VERIFICATION AND MANAGEMENT

CROSS-REFERENCE TO RELATED APPLICATION

This application is a continuation of, and claims priority to, U.S. patent application Ser. No. 15/283,993, filed on Oct. 3, 2016, which claims priority to U.S. Provisional Patent Application No. 62/270,658, filed on Dec. 22, 2015, each of which are hereby incorporated by reference in their entireties.

BACKGROUND INFORMATION

Identity providers issue identities for use in identifying individuals for a variety of purposes. For example, state agencies issue driver licenses or passports to individuals for use in identifying those individuals to law enforcement personnel, accessing state-provided services and systems, enabling entitlements, etc.

Different identity providers provide identities using different methodologies. State agencies typically provide identities to citizens of specified jurisdictions based on verifying citizenship. Employers typically provide identities to employees, for purposes of providing selective access to facilities, benefits, etc., based on employee information. Consumer services companies may provide identities to customers, for purposes of providing selective access to these services, based on customer information.

The identities may take a variety of forms, from traditional physical manifestations, such as cards or other documents, to digital forms, such as user names, passwords, etc. For example, state agencies typically provide a card, document or other tangible item that the individual then physically presents to gain access to services or systems. A computing services company may provide a user name, password, etc., that that individual presents via a communication interface to access the service.

A variety of third parties also rely upon identities provided by identity providers to selectively authorize access to their services and systems. For example, hotels, car rental companies, etc. typically require an individual to provide a valid state-issued identity before a rental takes place. Such third parties implement a variety of different processes to verify the validity and entitlements of the identity, such as ranging from a mere verification that a physical identity exists, to a more detailed visual inspection, such as including checking for expected elements, etc.

However, many problems exist with providing and utilizing identities. The traditional nature of some existing identities and authorization procedures presents a danger of fraud as developing technologies prove increasingly effective at counterfeiting such identities. For example, traditional identity cards, documents, etc., even if they contain anti-counterfeiting measures such as incorporated marks, holograms, etc., are increasingly subject to successful reproduction by modern techniques. Even digital identities remain vulnerable to correspondingly digital techniques.

The large variety of identities, identity providers, and third party systems also has resulted in a highly differentiated identity environment. An individual typically needs to interact with a multitude of identity provides to create a corresponding number of identities, which the individual must then maintain and provide in a varying fashion to a multitude of different third parties. Likewise, many third parties find it necessary to accept, and thus provide a corresponding verification mechanism, for a variety of different identities. Such a fractured identity environment creates inefficiencies in producing and utilizing identities for both individuals and third parties.

Thus, a need exists for devices, systems and methods to create, verify, and maintain identities with increased security and efficiency.

BRIEF DESCRIPTION OF THE DRAWINGS

So that the features of the present invention can be understood, a number of drawings are described below. However, the appended drawings illustrate only particular embodiments of the invention and are therefore not to be considered limiting of its scope, for the invention may encompass other equally effective embodiments.

FIGS. 21A-21C depict embodiments of a user interface of a restricted access system interface module of the integrated identity system.

DETAILED DESCRIPTION OF EXAMPLE EMBODIMENTS

Figure 1:
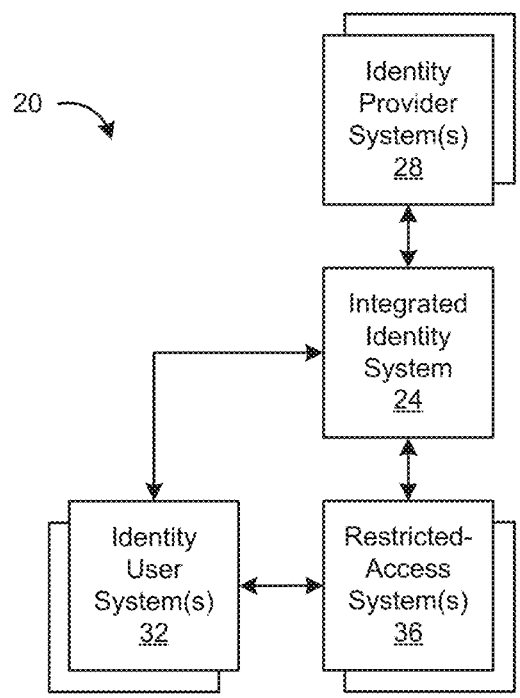
FIG. 1 is a schematic diagram depicting an embodiment of a system to provide identity services.

Embodiments of an integrated identity system may create, verify and manage an identity within an identity element repository of the system to enable improved security. The integrated identity system also may provide a federated approach to identity, in which identities and identity services may be utilized across a plurality of different identity providers and restricted access systems, enabling improved efficiency.

An identity corresponding to an identity issued by an identity provider may be created within the integrated identity system. Embodiments of a method of creating an identity within the integrated identity system may include receiving identity data from the identity provider, and generating one or more transactions to store an identifier representing the identity data in an identity element repository. The identifier stored in the repository may include a cryptographically encoded representation of at least a portion of the identity data. In embodiments, the identity element repository may include a distributed system such as a distributed blockchain ledger or a distributed smart contract system, and the transaction may be transmitted to at least one node of the distributed system to store the identifier on a blockchain of the distributed system or invoke an identity data creation function of an identity services contract stored on the blockchain to store the identifier.

Creating the identity within the integrated identity system also may include generating an identity token corresponding to the identity for distribution to the individual for use in invoking access to restricted access systems. The identity token may include one or more components configured to trigger an identity verification process of the integrated identity system or the restricted access system. An individual may use an identity user system, such as, e.g., a mobile device, to store the identity token and present it to a restricted access system.

Metadata also may be stored within the integrated identity system in association with an identity. The metadata may relate to, for example, the individual or the identity provided by the identity provider for the individual. The metadata may be utilized to provide verification functions, data storage functions, etc. associated with the identity. Embodiments of a method of adding metadata in association with the identity within the integrated identity system may include receiving the metadata and the identifier of the identity, and generating one or more transactions to store the metadata in the identity element repository in association with the identifier. In embodiments, the transaction may be transmitted to at least one node of a distributed system to store the metadata in association with the identifier on a blockchain of the system or invoke a metadata function of the identity services contract to store the metadata on the blockchain.

The identity may be verified within the integrated identity system in an improved manner, to enable increased security and identity fraud prevention. Embodiments of a method of verifying the identity may include receiving a presentation of an identity token by an individual, extracting an identifier from the identity token, and generating a transaction to determine whether the identifier is stored in the identity element repository. In embodiments, the transaction may be transmitted to at least one node of a distributed system to determine whether the identifier exists on a blockchain of the system, or may invoke an identity verification function of the identity services contract stored on the blockchain to perform the determination. A corresponding method of providing access to a restricted access system may include authorizing or denying access to the restricted access system as a result of the verification.

A multifactor identity verification process also may be provided to further enhance the security and effectiveness of the identity verification. Embodiments of multifactor identity verification may include verifying the identity in the integrated identity system and a physically verifying the individual presenting the identity token. The method may include receiving the identity token from the individual, verifying a corresponding identity within the integrated identity system, determining a physical trait of the individual, and verifying the physical trait against the individual. In embodiments, determining the physical trait of the individual may include extracting data related to the individual from the identity token. A corresponding method of providing access to a restricted access system may include authorizing or denying access to the restricted access system as a result of these verifications.

A multiphase identity verification process also may be provided. Embodiments of a multiphase verification process may include an initial, relatively more rigorous verification phase, and a subsequent, relatively less rigorous verification phase. The initial verification may include embodiments of one or more of verifying the identity within the integrated identity system or performing a multifactor verification, etc. An initial access to a restricted access system may be authorized or denied as a function of this initial verification. For a subsequent verification, an abbreviated verification may be performed, such as, e.g., only a single factor verification such as verification of a physical trait against the individual. A subsequent access to the restricted access system may be authorized or denied as a result.

In embodiments, an identity services contract may be stored on a blockchain of a distributed identity element repository to implement one or more identity and metadata creation, verification, and retrieval functions etc. Embodiments of a method of publishing an identity services contract within the distributed identity repository module may include generating a compiled identity services contract, generating one or more transactions to publish the identity services contract to the blockchain of the distributed identity element repository, and distributing the generated transaction to at least one node of the distributed identity element repository.

Embodiments of a method of retrieving metadata associated with an identity in the integrated identity system may include invoking a metadata read function of the identity services contract.

Embodiments of a non-transitory machine-readable storage medium may include program instructions that when executed by a processor perform embodiments of the methods of providing identity services discussed herein.

Embodiments of the integrated identity system may include a processor and a non-transitory machine-readable storage medium having program instructions that when executed by the processor perform embodiments of the methods of providing identity services discussed herein.

FIG. 1 depicts an embodiment of a system 20 to provide identity services in an improved manner. The system may include an integrated identity system 24, one or more identity provider systems 28, one or more identity user systems 32, and one or more restricted access systems 36.

The integrated identity system 24 may provide identity services to one more of the identity provider system 28, restricted access system 36, or identity user system 32. To provide services such as identity creation, identity management, etc., the integrated identity system 24 may receive identity data from the identity provider system 28, and generate and store corresponding identities. To provide services such as identity verification, data retrieval, etc., the integrated identity system 24 may receive service requests from the restricted access system 36, and provide corresponding data to the restricted access system 36. To provide services such as identity access, identity management, etc., the integrated identity system 24 may store and provide identity data for the identity user systems 32.

The identity provider systems, restricted access systems, and identity user systems may interface with the integrated identity system to request, receive, or otherwise engage identity services, etc. For example, the identity provider systems 28 may generate identities for individuals, and provide identity data to the integrated identity system 24 representing the generated identities. The restricted access systems 36 may receive a presentation of an identity token from an individual requesting access to the restricted access system 36, and submit requests to the integrated identity system 24 to verify the corresponding identity. The identity user systems 32 may receive an identity token representing a generated identity, and present the identity token to the restricted access systems 36 to request access to the system 36.

The integrated identity system 24, identity provider systems 28, restricted access systems 36 and identity user systems 32 may each be owned, operated and/or located by different entities. For example, the integrated identity system 24 may be owned, operated and/or located by a first entity, such as a corporation providing federated identity services, etc., to one or more of an identity provider, an individual, or a third party. An identity provider system 28 may be owned, operated and/or located by a second entity, such as a governmental body, corporation or other entity providing identities to individuals. A restricted access system 36 may be owned, operated and/or located by a third entity, such as a corporation or other entity providing services, products, etc. to individuals contingent upon verification of the individual's identity. The identity user system 32 may be owned, operated and/or located by an individual receiving the identity from the identity provider and seeking to use the identity.

Figure 2:
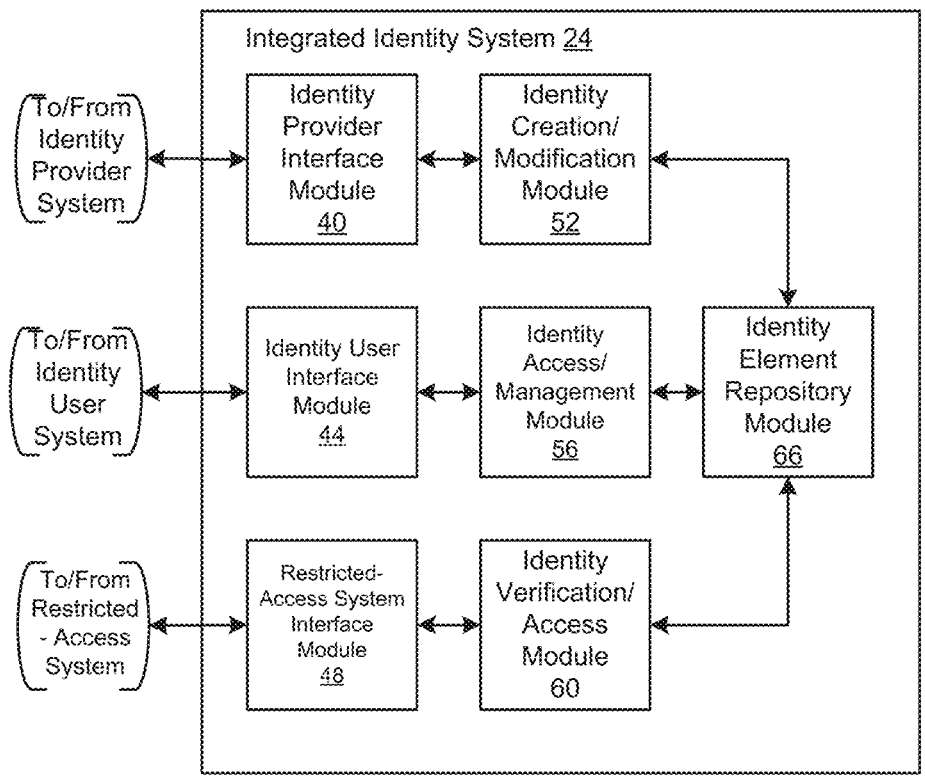
FIG. 2 is a schematic diagram depicting an embodiment of an integrated identity system.

FIG. 2 depicts an embodiment of the integrated identity system 24. The integrated identity system 24 may include an identity provider interface module 40, an identity user interface module 44, a restricted access system interface module 48, an identity creation and modification module 52, an identity access and management module 56, an identity verification and access module 60, and an identity element repository module 66.

The identity provider, identity user and restricted access system interface modules 40, 44, 48 may provide interfaces to the integrated identity system 24 to receive information from, and provide information to, the identity provider, identity user and restricted access systems 28, 32, 36.

The identity creation and modification module 52 may receive requests related to creating or modifying identity data and identity tokens from the identity provider system 28 through the respective interface module 40, and execute or control execution of corresponding identity data creation and modification functions. The identity access and management module 56 may receive requests related to accessing and managing identity data from the identity user system 32 through the respective interface module 44, and execute or control execution of corresponding identity access and management functions. The identity verification and access module 60 may receive requests related to verifying identities from the remote access system 36 through the respective interface module 48, and execute or control execution of corresponding identity verification functions.

The identity element repository module 66 may provide a data structure to store identity data, which may provide secure and reliable verification and access to the identity data.

In embodiments, the identity element repository module 66 may include a distributed database such as a distributed blockchain transaction ledger. In embodiments, the distributed blockchain transaction ledger also may be further configured to execute transactions incorporating program code, such as as a distributed smart contract system. Alternatively, the identity repository module 66 may include other types of databases, such as a distributed database other than a distributed blockchain transaction ledger or distributed smart contract system, or a non-distributed database.

Figure 3:
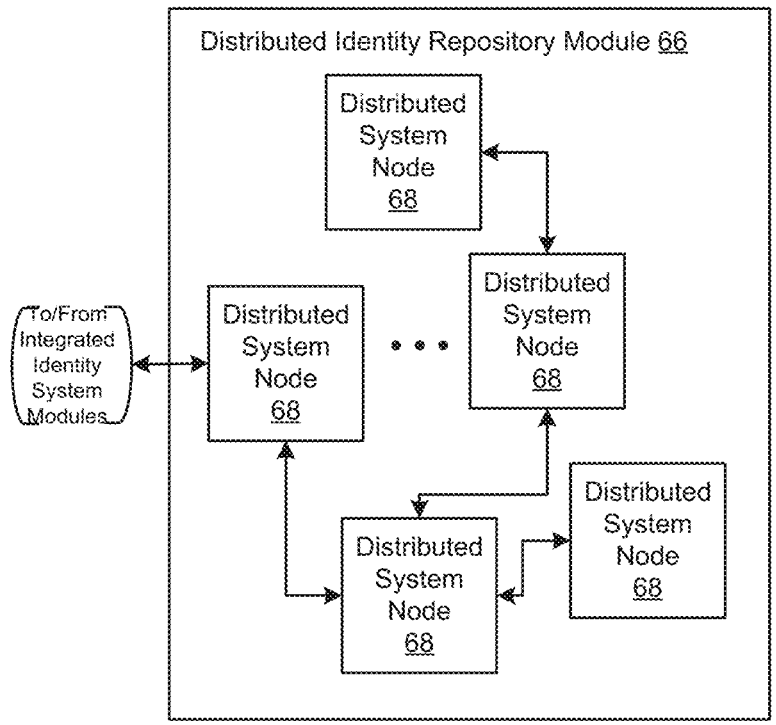
FIG. 3 is a schematic diagram depicting an embodiment of a distributed identity element repository.

FIG. 3 depicts an embodiment of the identity element repository module 66 implemented using a distributed system, such as a distributed blockchain transaction ledger or a distributed smart contract system. The distributed identity element repository module 66 may include a plurality of distributed system nodes 68. The distributed system nodes 68 may be organized as a peer-to-peer network, in which each of the nodes 68 may connect to one or more of the other nodes 68 using a peer-to-peer communication protocol. At least one of the distributed system nodes 68 also may connect to the identity creation, access and verification etc. modules 52, 56, 60 to provide communication between the distributed identity element repository 66 and these modules 52, 56, 60 to execute the identity data creation, modification, management, verification and access functions, etc. As a peer-to-peer network, the configuration of connections between individual distributed system nodes 68 may change over time according to operation of the peer-to-peer protocol.

Figure 4:
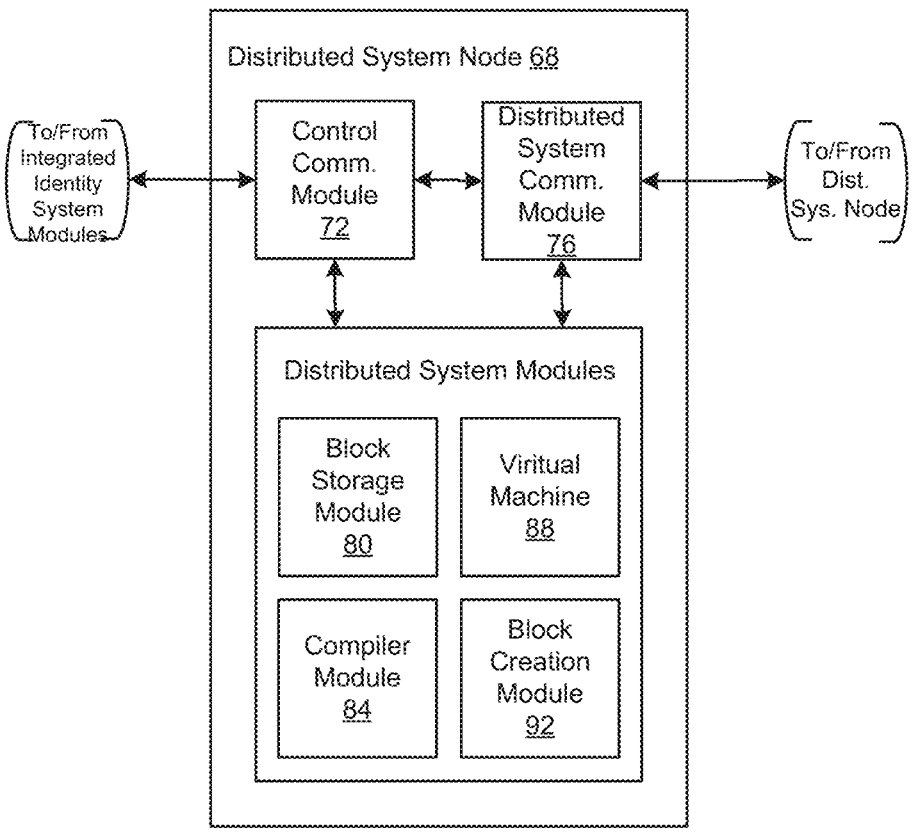
FIG. 4 is a schematic diagram depicting an embodiment of a distributed smart contract system node.

FIG. 4 depicts an embodiment of the distributed system node 68. The distributed system node 68 may include a control communication module 72, a distributed system communication module 76, and one more distributed system modules. The control communication module 72 may be connected to and receive control commands from and provide corresponding data back to the identity creation, access and verification modules 52, 56, 60. The distributed system communication module 76 may be connected to at least one other distributed system node 68 to provide peer-to-peer communication between the nodes 68. The distributed system modules may include one or more of a block storage module 80, a block creation module 92, a compiler module 84, or a virtual machine module 88. The block storage module 80 may store blocks of the blockchain transaction ledger. The block creation module 92 may perform an algorithm to incorporate transactions into blocks of the blockchain transaction ledger, such as by performing cryptographic calculations of a selected difficulty, also referred to as mining blocks of the blockchain, although other algorithms to arrive at consensus of the identity of new blocks are possible. The compiler module 84 may compile program instructions of a program, script, etc., such as, e.g., a smart contract, for incorporation within a transaction into the blockchain transaction ledger. The virtual machine module 88 may execute such compiled programs, scripts, smart contracts, etc.

In embodiments, the distributed system node 68 may be configured to include only selected subsets of the components depicted in FIG. 4. For example, a distributed system node 68 not directly connected to function modules 52, 56, 60 of the integrated identity system may omit the control communication module 72 receiving control commands from these modules. A distributed system node 68 also may be configured to perform only a subset of the functions performed by the distributed system modules, such as only a selected one or more of storing blocks, creating new blocks, compiling program instructions, or executing compiled program instructions, etc., and in such embodiments the node may include only the corresponding one or more of the block storage module 80, block creation module 92, compiler module 84, or virtual machine module 88.

Components of the integrated identity system 24, identity provider system 28, restricted access system 36 and identity user systems 32 may be implemented as hardware, software, or a mixture of hardware and software. Components of the integrated identity system 24, identity provider system 28, restricted access system 36 and identity user systems 32 also may be implemented using server-side module(s), client-side module(s), local module(s), remote module(s), or a mixture thereof.

For example, components of the integrated identity system 24, such as any individual one, subset, or all of the identity provider interface module 40, identity user interface module 44, restricted access system interface module 48, identity creation and modification module 52, identity access and management module 56, identity verification and access module 60, and identity element repository module 64 may be implemented using a processor and a non-transitory storage medium, where the non-transitory machine-readable storage medium may include program instructions, which when executed by the processor may perform embodiments of the functions of such components discussed herein, such as embodiments of methods of creating, modifying, accessing, managing, and verifying identities, etc. discussed herein. In one embodiment, the integrated identity system 24 may include an Internet or other communication network based application layer supported by a computing architecture, with one or more of the identity provider interface, identity user interface, and restricted access system interface modules 40, 44, 48 providing portals for the identity provider, identity user and third party to access the integrated identity system 24.

Components of the identity provider system 28, restricted access system 36 and identity user systems 32, such as any individual one, subset, or all of such components, also may be implemented using a processor and a non-transitory machine readable storage medium, where the non-transitory storage medium may include program instructions, which when executed by the processor may perform embodiments of the functions of such components discussed herein, such as embodiments of methods of creating, modifying, accessing, managing, and verifying identities, etc. discussed herein. In one embodiment, the identity provider system 28, restricted access system 36 and identity user systems 32 may include computing systems, such as computer terminals, mobile devices, etc. to access Internet or other communication network based portals provided by the integrated identity system.

Figure 5:
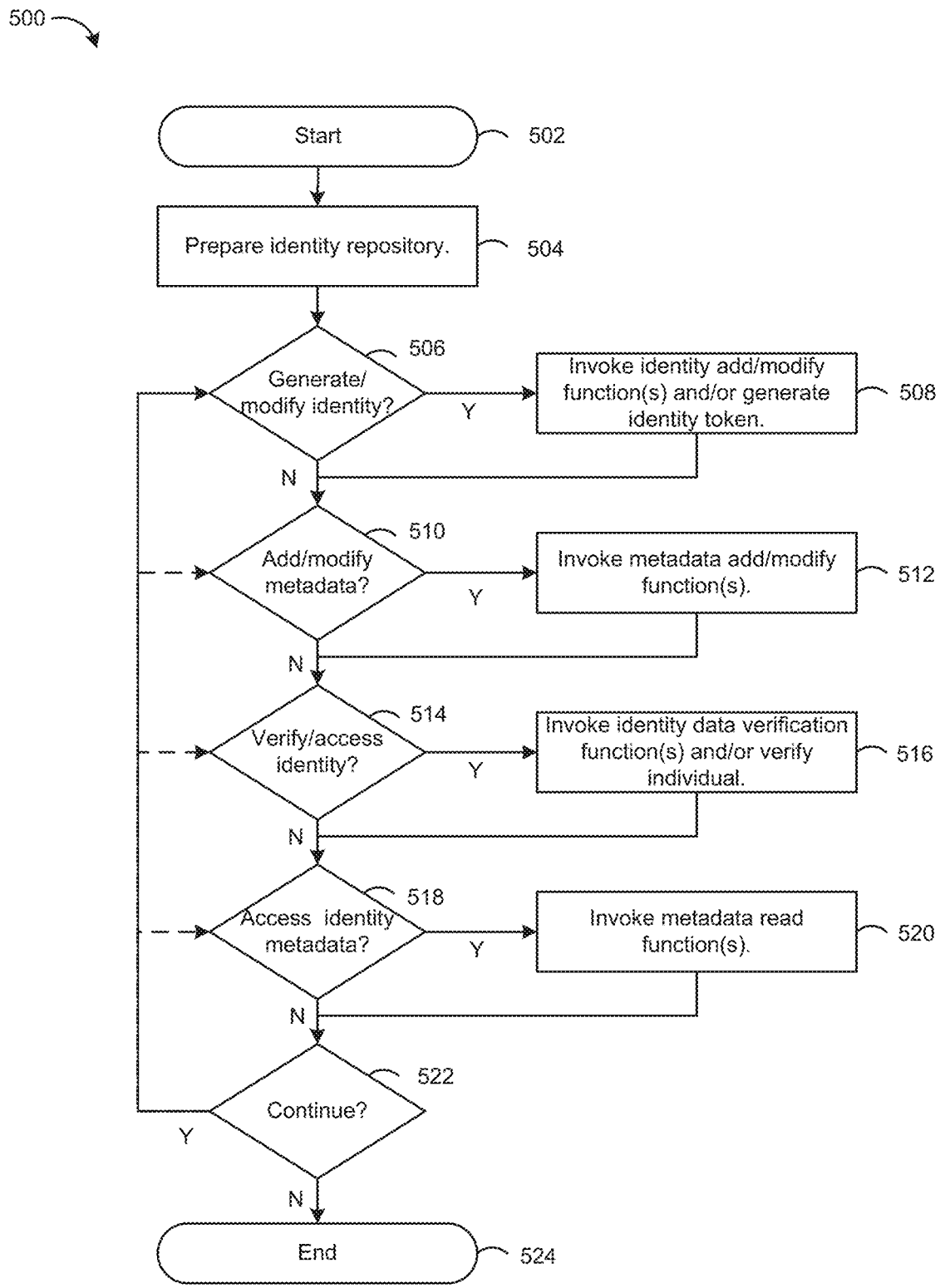
FIG. 5 is a flowchart depicting an embodiment of a method of providing identity services.

FIG. 5 depicts an embodiment of a method 500 of providing integrated identity services to one or more of an identity provider, an individual, or a third party restricted access system with improved security and efficiency. In embodiments, the method may provide for creation, modification, verification, etc., of an identity within an identity element repository, enabling improved security by greatly increasing the difficulty of counterfeiting such an identity. Additionally, in embodiments, the method may provide a federated approach to identities, where the same identities and identity services may be utilized across a plurality of different identity providers, third party restricted access systems, etc., enabling improved efficiency by reducing duplication and unnecessary differentiation of such identities and services.

In embodiments, the method of providing identity services may be conducted by an entity, such as a corporation, providing integrated identity services to one or more of an identity provider, an individual, or a third party, such as by implementing and/or operating embodiments of the integrated identity system 24.

The method may begin at step 502. At step 504, the identity element repository 64 may be prepared. Preparing the identity element repository may include initialing a database to contain identity data. For example, in embodiments in which the identity element repository includes a distributed system, such as a distributed smart contract system, preparing the identity element repository may include publishing an identity services contract to a blockchain, such as discussed below in regard to FIG. 6.

At step 506, it may be determined whether a request has been received, such as from an identity provider, to generate or modify an identity within the integrated identity system 24. If a request has been received to generate or modify an identity, the method may proceed to step 508, otherwise the method may proceed to step 510.

At step 508, one or more identity creation, modification, etc. functions may be invoked to create or modify an identity, a corresponding identity token, etc. according to the request. The integrated identity system 24 may generate, modify, manage, verify, etc., an identity within the integrated identity system in association with an identity generated by an identity provider for an individual, such as in response to a request from a third party, with increased security. The integrated identity system 24 also may generate, modify, manage, etc. an identity token associated with the identity and identity data. The identity token may be distributed to the individual for use in invoking the identity and identity verification process at a restricted access system 36. Creating or modifying the identity data may include invoking a function to create or modify an identifier representing the identity data within a database of the identity element repository. In embodiments in which the identity element repository includes a distributed system, such as a distributed blockchain ledger or distributed smart contract system, creating or modifying the identity data within the identity element repository may include storing or modifying the identifier representing the identity data within a data structure on a blockchain, such as by generating a transaction to store or modify the identifier on the blockchain or invoking an identity data creation or modification function of an identity services contract published to the blockchain to store or modify the identifier on the blockchain, e.g., as discussed below in regard to FIG. 9.

At step 510, it may be determined whether a request has been received, such as from an identity provider, to generate or modify metadata associated with an identity within the integrated identity system 24. If a request has been received to generate or modify metadata, the method may proceed to step 512, otherwise the method may proceed to step 514.

At step 512, one or more of a metadata creation or modification functions may be invoked to create or modify metadata associated with an identity according to the request. The integrated identity system 24 may generate, modify, manage, access, etc., metadata associated with an identity, which may enable functionality or services associated with identities. Creating or modifying the metadata may include invoking a function to create or modify the metadata in association with the identity within a database of the identity element repository. In embodiments in which the identity element repository includes a distributed system, such as a distributed blockchain ledger or distributed smart contract system, creating or modifying the metadata within the identity element repository may include storing or modifying the metadata within a data structure associated with the identity on a blockchain, such as by generating a transaction to store or modify such a data structure on the blockchain or invoking a metadata data creation or modification function of the identity services contract to store or modify such a data structure on the blockchain, e.g., as discussed below in regard to FIG. 12.

At step 514, it may be determined whether a request has been received, such as from a restricted access system, to verify an identity within the integrated identity system. If a request has been received to verify an identity, the method may proceed to step 516, otherwise the method may proceed to step 518.

At step 516, one or more identity verification functions may be invoked to verify the identity according to the request. An individual may present one or more of the identity token and their individual person to a restricted access system operator to invoke their identity. The identity token may contain information to trigger a verification process for the identity. Verifying the identity may include invoking a function to verify the identifier representing the identity data within a database of the identity element repository. In embodiments in which the identity element repository includes a distributed system, such as a distributed blockchain ledger or distributed smart contract system, verifying the identity may include searching for or reading a data structure containing the identifier representing the identity data on a blockchain, such as by invoking an identity data verification function of the identity services contract, etc., e.g., as discussed further below in regard to FIGS. 17, 19 and 22.

Verifying the identity also may include performing a verification of a physical trait of the individual in addition verifying the identity within the identity element repository, such as to provide a multifactor identity verification. In embodiments, the physical verification may include determining the physical trait of the individual, such as by extracting data from the identity token, and verifying the determined trait against the individual presenting the identity token, such as discussed further below in regard to FIGS. 17 and 22.

At step 518, it may be determined whether a request has been received, such as from an individual, identity provider or restricted access system, to access metadata associated with an identity within the integrated identity system 24. If a request to access metadata has been received, the method may proceed to step 520, otherwise the method may proceed to step 522.

At step 520, one or more metadata access functions may be invoked to access metadata associated with an identity according to the request. Accessing the metadata may include invoking a function to access the metadata stored in association with the identity within a database of the identity element repository. In embodiments in which the identity element repository includes a distributed system, such as a distributed blockchain ledger or distributed smart contract system, accessing the metadata within the identity element repository may include searching for or reading a data structure on a blockchain associated with the identifier representing the identity data on the blockchain, such as by invoking a metadata data access function of the identity services contract, etc., e.g., as discussed below in regard to FIG. 24.

The determinations of steps 506, 510, 514, and 518 may be performed by the integrated identity system 24, such as by monitoring communications from the identity provider system 28, the identity user system 32, and the restricted access system 36 through the identity provider interface, identity user interface, and restricted access system interface modules 40, 44, 48. Additionally, although FIG. 5 depicts one possible order of performance of the determinations of steps 506, 510, 514, and 518, in other embodiments, the determinations of steps 506, 510, 514, and 518 may be performed in any other relative order, simultaneously, or upon demand in response to communications from the identity provider system 28, the identity user system 32, and the restricted access system 36 through the identity provider interface, identity user interface, and restricted access system interface modules 40, 44, 48.

At step 522, it may be determined whether to continue making the determinations of steps 506, 510, 514 and 518. If it is determined to continue, the method may proceed back to any of steps 506, 510, 514 and 518, otherwise the method may proceed to step 524, where the method may end.

Figure 6:
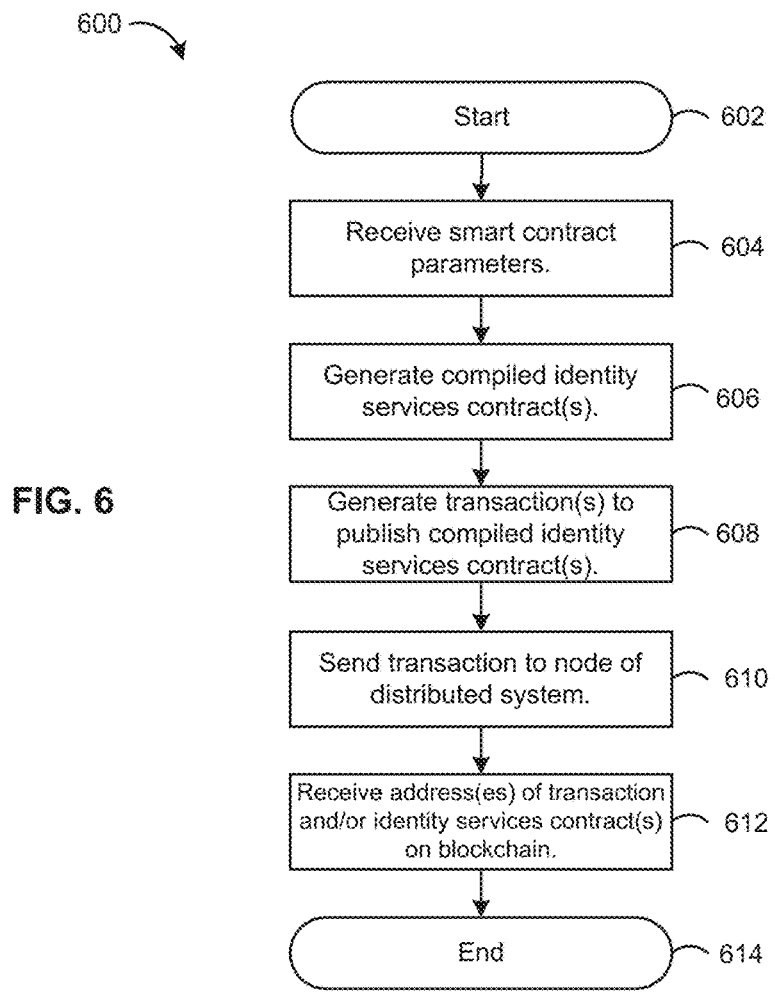
FIG. 6 is a flowchart depicting an embodiment of a method of publishing an identity services contract to a blockchain of the distributed identity element repository.

FIG. 6 depicts an embodiment of a method 600 of publishing an identity services contract into the distributed identity repository module. In embodiments in which the identity element repository includes a distributed system such as a distributed smart contract system, embodiments of the method 600 may be used to implement the step 504 of preparing the identity element repository of the method 500 of FIG. 5.

The method 600 may begin at step 602. At step 604, parameters that define features of the smart contract may be received. The parameters may include one or more of an identification of the identity data, an identification of functions to be implemented by the identity services contract, a division of the identity service functions to be implemented between identity services and other smart contracts, etc. The parameters may be received at the integrated identity system from the identity provider or identity provider system. In embodiments where the features of the smart contract do not need to be determined, such as where they have already been determined or coincide with a standard set of features, step 604 may be omitted.

At step 606, a complied identity services contract may be generated. The identity services contract may include program instructions to perform one or more of the identity services functions discussed herein. The identity services contract may be programmed in a programming or scripting language supported by the distributed identity element repository, such as by the compiler module 84 of a distributed system node 68 of the distributed identity element repository. The identity services contract may then be compiled using a complier supported by the distributed identity element repository, such as the complier module 84 of the distributed smart contract system node 68.

Figure 7:
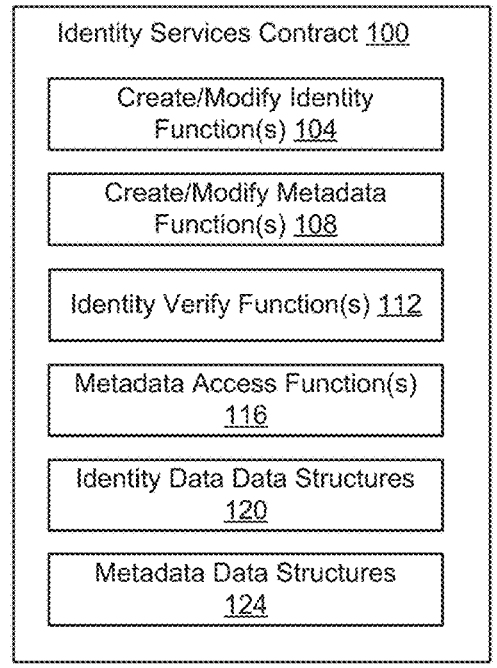
FIG. 7 is a schematic diagram depicting an embodiment of the identity services contract.

FIG. 7 depicts an embodiment of the identity services contract 100. The identity services contract 100 may include one or more program functions to implement functionality of the identity services contract described herein. For example, the identity services contract 100 may include one or more program functions 104 to create or modify identity data associated with an identity, one or more functions 108 to create or modify metadata associated with an identity, one or more functions 112 to verify the status of an identity, one or more functions 116 to retrieve metadata associated with the identity, etc. The identity services contract 100 also may define one or more data structures to store data to implement functionality of the identity services contract. For example, the identity services contract may define one or more data structures 120 to store identity data, one or more data structures 124 to store metadata, etc.

Returning to FIG. 6, at step 608 one or more transactions to publish the identity services contract to the blockchain of the distributed identity element repository may be generated. The distributed identity element repository may incorporate an ordered list of transactions in a distributed ledger represented by the blockchain, and in the case of the distributed identity element repository implementing a distributed smart contract system, transactions may include smart contracts being published for execution by successive transactions. To publish the complied identity services contract, a transaction may be generated containing the compiled identity services contract. The transaction may be generated by the integrated identity services system 24, such as by the identity creation and modification module 52 of the integrated identity services system 24, or the control or distributed system communication modules 72, 76 of one of the distributed smart contract system nodes 68 directly connected to, such as local to, such module.

At step 610, the generated transaction containing the compiled identity services contract may be transmitted to at least one of the distributed system nodes 68 of the distributed identity element repository 66. The transaction may be sent to the at least one node by one of the distributed system nodes 68 directly connected to, such as local to, the identity creation and modification module 52 of the integrated identity system 24. Sending the transaction to at least one distributed system node 68 may trigger the transaction to be included in a process by one or more of the distributed system nodes 68 to incorporate a set of new transactions into a block of the blockchain stored by nodes of the distributed identity element repository. This process may be performed by a block creation module 92 of the at least one distributed system node 68. In embodiments, the process may include performing cryptographic calculations of a selected difficulty. Several nodes 68 of the distributed identity element repository may compete with each other to create the new block, with the first node to successfully perform the process winning the race and creating the new block. The new block may then be transmitted to other nodes 68 of the distributed identity element repository, which may incorporate the block into their stored version of the blockchain upon confirming its validity. Once incorporated into a block, the transaction has been executed, publishing the contract to the blockchain.

At step 612, an address of the location on the blockchain into which the transaction has been incorporated may be received. Execution of the transaction to publish the identity services contract may generate a receipt indicating an address at which the identity services contract resides on the blockchain. The address may be received by the integrated identity system, such as by the identity creation and modification module 52 of the integrated identity system 24 or the at least one distributed system node 68 directly connected to, such as local to, modules of the integrated identity system 24. The method may end at step 614.

Figure 8:
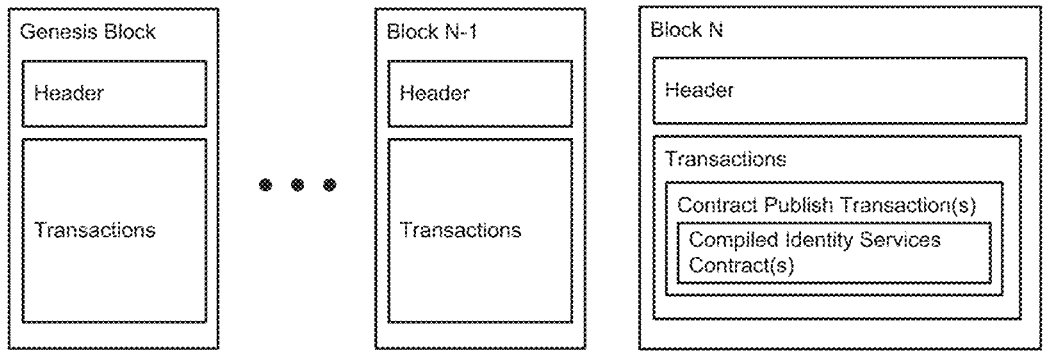
FIG. 8 is a schematic diagram depicting an embodiment of the blockchain of the distributed identity element repository after incorporation of a transaction publishing the identity services contract into the blockchain.

FIG. 8 depicts an embodiment of a blockchain of the distributed identity element repository 66 after publication of the identity services contract to the blockchain. The blockchain may include a plurality of sequentially ordered blocks. Each block may include a header and a set of transactions. One or more of the header or transactions may be cryptographically encoded. A first block in the plurality of blocks may be referred to as a genesis block. In FIG. 8, a subsequent block, such as an Nth block, may incorporate the transaction to publish the identity services contract, although in other embodiments any block may incorporate the transaction. The transaction may include a copy of the complied identity services contract. One or more of the transaction or the included complied identity services contract may be cryptographically encoded.

Figure 9:
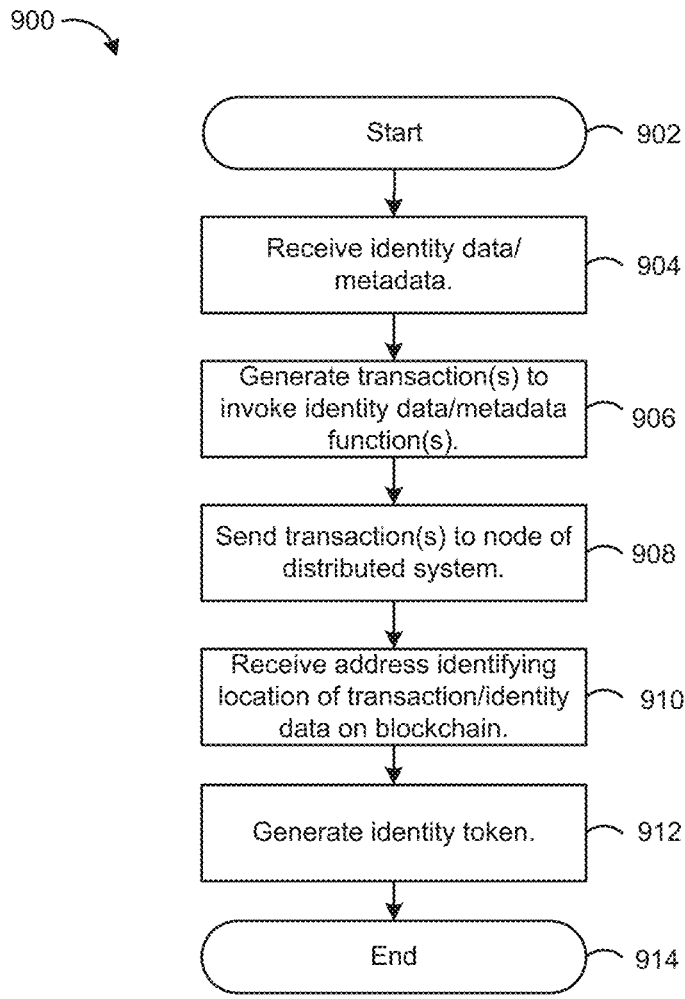
FIG. 9 is a flowchart depicting an embodiment of a method of creating an identity within the integrated identity system.

FIG. 9 depicts an embodiment of a method 900 of creating an identity within the integrated identity system 24 corresponding to an identity generated by an identity provider for an individual. In embodiments in which the identity element repository includes a distributed system, such as a distributed blockchain ledger or distributed smart contract system, embodiments of the method 900 may be used to implement the generation of an identity within the identity element repository of step 508 of the method 500 of FIG. 5. The method may begin at step 902.

At step 904, identity data associated with the identity generated by the identity provider may be received. The identity data may have been validated during an identity creation process conducted by the identity provider to generate the identity by the identity provider. The identity data may include one or more pieces of data identifying the individual, such as at least one of: a name of the individual, such as an actual name of the individual, a user name of the individual, etc.; an identification number of the identity of the individual, such as a social security number, a driver's license number, a passport number, etc.; an address of the individual, such as a physical address, an e-mail address, etc.; basic biological information of the individual, such as an age, a gender, a height, a weight, an eye color, a hair color, etc.; or a representation of a biometric trait of an individual, such as a picture of the individual, a representation of a fingerprint, a representation of a facial pattern, a representation of an iris pattern, a representation of a retina pattern, a representation of a voice, a representation of a deoxyribonucleic acid (DNA) pattern, etc. The identity data may be received from the identity provider system by the integrated identity system via the identity provider interface module.

Figure 10A:
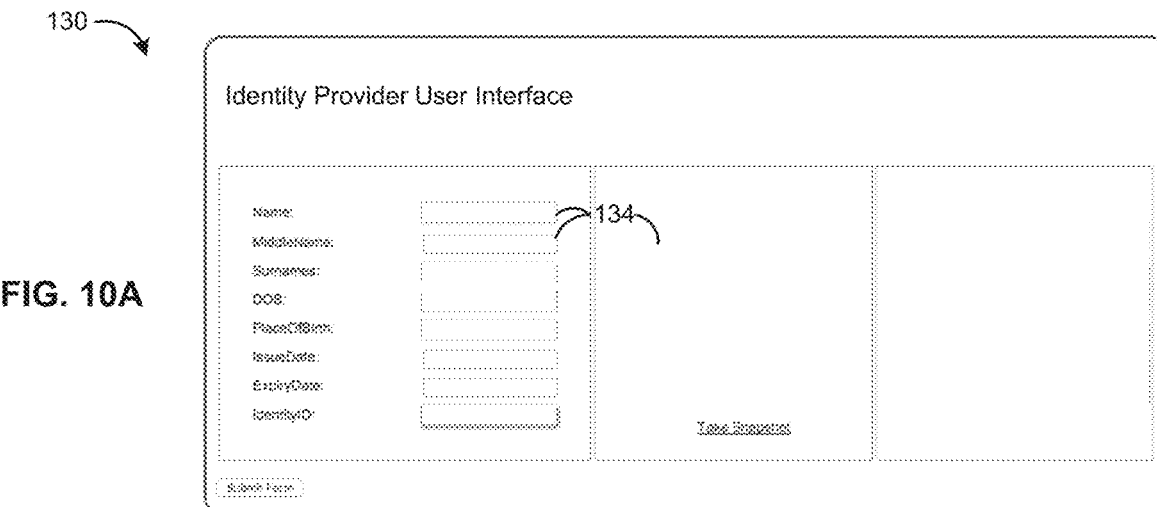
FIGS. 10A-10C depict embodiments of a user interface of an identity provider interface module of the integrated identity system.
Figure 10B:
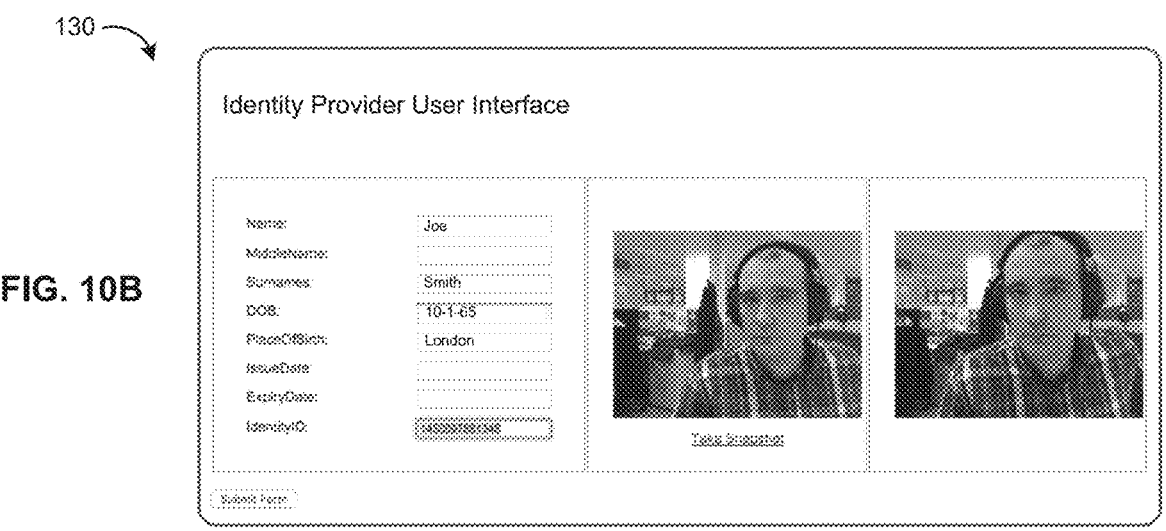
Figure 10C:
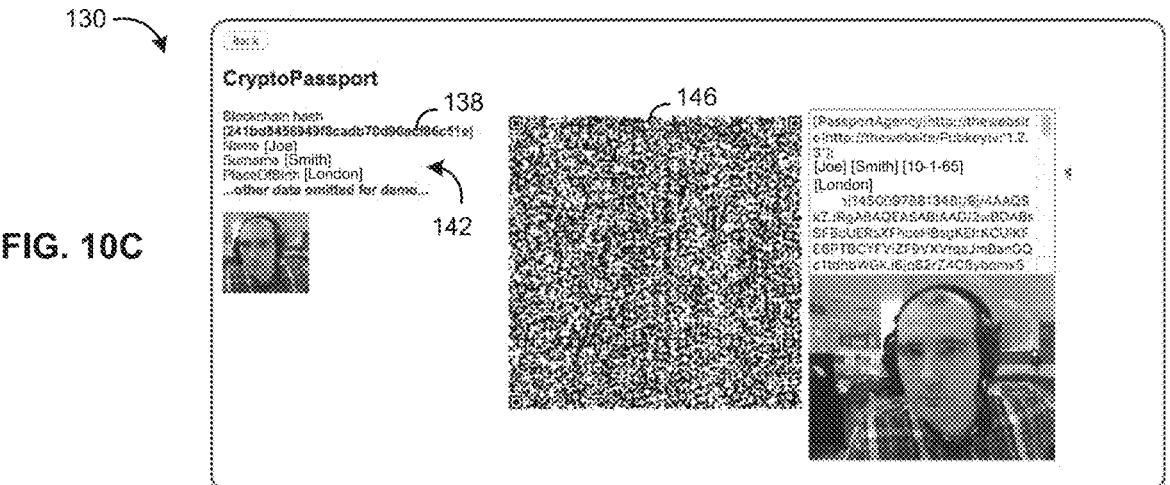

FIGS. 10A-10C depict embodiments of a user interface 130 provided to the identity provider system 28 by the identity provider interface module 40. FIG. 10A depicts an embodiment of the user interface 130 prior to receipt of any identity data. The user interface 130 may include a plurality of fields 130 and corresponding identifiers to accept different types of identity data. In FIG. 10A, the user interface may include fields to accept a first name, a middle name, a last name, a date of birth, a place of birth, an identity issue date, an identity expiration date, an identity identification number, and a photo of the individual. FIG. 10B depicts an embodiment of the user interface 130 after entry of at least some validated identity data.

Returning to FIG. 9, at step 906, one or more transactions may be generated to store an identifier representing the received identity data on a blockchain. In embodiments in which the identity element repository includes a distributed smart contract system, the transaction may invoke an identity data creation function 104 of the identity services contract. Functions of the identity services contract published into the blockchain and designed for execution may be executed by transactions invoking such functions. To invoke the identity data creation function, a transaction including a call to invoke the function may be generated. The call to the identity data creation function may include as an input to the function an identifier representing the identity data. The identifier may include a cryptographically encoded version of the received identity data. For example, the identifier may include the received identity data cryptographically encoded using one or more cryptographic hash functions, such as one or more of variants of the secure hash algorithm 2 (SHA-2), variants of the secure hash algorithm 3 (SHA-3), etc. A result of the execution of the function may store the identifier representing the identity data in a data structure on the blockchain, such as in a data structure 120 of the identity services contract on the blockchain.

At step 908, the generated transaction may be transmitted to at least one of the distributed system nodes 68 of the distributed identity element repository. The transaction may be sent to the at least one node 68 by one of the distributed system nodes 68 directly connected to, such as local to, the identity creation and modification module 52 of the integrated identity system 24. As with step 610 of method 600 of FIG. 6, sending the transaction to at least one distributed system node 68 may trigger the transaction to be included in a process by one or more of the distributed system nodes 68 to incorporate the transaction into a block of the blockchain stored by nodes 66 of the distributed identity element repository. Once incorporated into a block, the transaction has been executed, invoking the identity data creation function.

At step 910, an address of the location on the blockchain of the transaction may be received. The address may be received by the integrated identity system 24, such as by the identity creation and modification. module 52 of the integrated identity system 24 or the at least one distributed system node 68 directly connected to, such as local to, modules of the integrated identity system 24.

At step 912, an identity token corresponding to the identity created within the integrated identity system 24 may be generated. The identity token may be distributed to the individual for presentation at a restricted access system 36 to invoke their identity. The identity token may include one or more components to trigger one or more identity verification functions. For example, the identity token components may include the identifier representing the received identity data stored on the blockchain, which may be used during a verification process to invoke an identity verification function, such as of the identity services contract. The identity token components also may optionally include one or more further components, such as one or more of: the received identity data, a digital signature created using a private key of the identity provider, an indication of an identity of the identity provider, or an indication of a specific public key of the identity provider. The digital signature may be used during a subsequent verification process to verify the integrity of the identity token using a public key of the identity provider. The indication of the identity of the identity provider may be used to locate the public key of the identity provider. The indication of the specific public key of the identity provider may be used to locate the key among a plurality of public keys of the identity provider.

The identity token may take a variety of forms. In embodiments, the identity token may take the form of the one or more components of the identity token encoded into encoded data, such as a barcode, e.g., a one-dimensional barcode or a two-dimensional barcode. The method may end at step 614.

Returning to FIGS. 10A-10C, FIG. 10C depicts an embodiment of the user interface 130 provided to the identity provider system 28 by the identity provider interface module 40 upon creation of the identity within the integrated identity system 24. The interface 130 may display the representation of the validated identity data 138 stored on the blockchain, the validated identity data 142, and the generated identity token 146 (which as depicted may take the form of a two-dimensional barcode encoding the representation of the validated identity data stored on the blockchain, the validated identity data, the digital signature of the identity provider and the identity of the identity provider).

Figure 11:
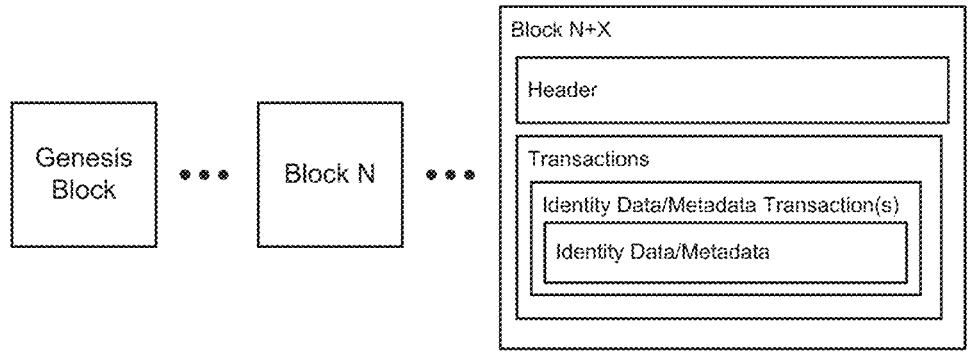
FIG. 11 is a schematic diagram depicting an embodiment of the blockchain of the distributed identity element repository after incorporation of a transaction creating an identity into the blockchain.

FIG. 11 depicts an embodiment of a blockchain of the distributed identity element repository after incorporation of a transaction to invoke the identity data creation function of the identity services contract into the blockchain. The blockchain may include the portion of the blockchain depicted in FIG. 8, followed by a subsequent portion leading to a subsequent block, such as an N+Xth block, that may incorporate the transaction invoking the identity creation function of the identity services contract, although in other embodiments any subsequent block may incorporate the transaction. The transaction may include the representation of the validated identity data.

Figure 12:
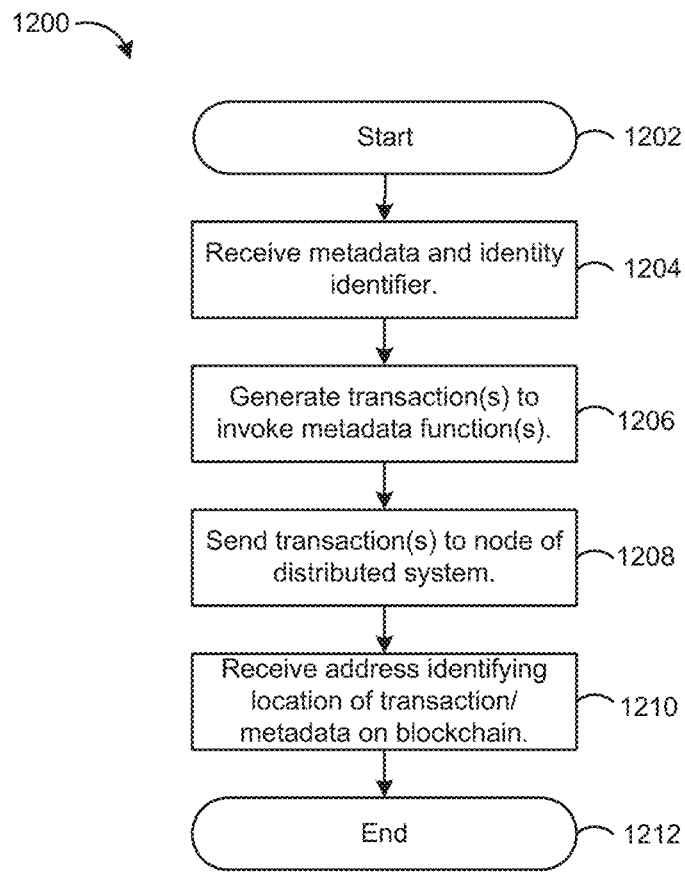
FIG. 12 is a flowchart depicting an embodiment of a method of adding metadata in association with an identity within the integrated identity system.

FIG. 12 depicts an embodiment of a method 1200 of adding or modifying metadata in association with an identity within the integrated identity system. In embodiments in which the identity element repository includes a distributed system, such as a distributed blockchain ledger or distributed smart contract system, embodiments of the method 1200 may be used to implement the adding or modifying of metadata associated with an identity within the identity element repository of step 512 of the method 500 of FIG. 5. The method may begin at step 1202.

At step 1204, metadata and an identifier of an identity within the integrated identity system may be received. The metadata may relate to, for example, the individual or the identity provided by the identity provider for the individual. Metadata related to the individual may include identity data related to the individual. Metadata related to the identity provided by the identity provider for the individual may include a current status of the identity, such as whether the identity has been revoked, an expiration date of the identity, etc. In embodiments, the metadata may include data not included in the identity data used to generate the identifier stored in the identity element repository. The identifier may identify the identity of the individual within the integrated identity system. Depending upon and according to use scenarios for the metadata, the metadata and identifier may be received from one or more of the identity provider system, such as via the identity provider interface module; the identity user system, such as via the identity user system interface module; or the restricted access system, such via the restricted access system interface module.

At step 1206, one or more transactions may be generated to store the metadata on the blockchain in association with the corresponding identity. In embodiments in which the identity element repository includes a distributed smart contract system, the transaction may invoke a metadata addition or modification function of the identity services contract. The transaction may include a call to invoke the metadata function 108. The call to invoke the metadata function may include as an input to the function the metadata and the identifier of the identity. The metadata may be cryptographically encoded. A result of the execution of the function may store the representation of the metadata in a data structure on the blockchain in a data structure associated with the identity, such as a data structure 124 of the identity services contract associated with the identity on the blockchain.

At step 1208, the generated transaction may be transmitted to at least one of the distributed system nodes 68 of the distributed identity element repository. The transaction may be sent to the at least one node 68 by one of the distributed system nodes 68 directly connected to, such as local to, the identity creation and modification module 52 of the integrated identity system. As with other steps of sending transactions to a node, sending the transaction may trigger the transaction to be included in a process by one or more of the distributed system nodes 68 to incorporate the transaction into a block of the blockchain stored by nodes of the distributed identity element repository. Once incorporated into a block, the transaction has been executed, invoking the metadata creation or modification function.

At step 1210, an address of the location on the blockchain of the transaction may be received. The address may be received by the integrated identity system, such as by the identity creation and modification module 52 of the integrated identity system 24 or the at least one distributed system node 68 directly connected to, such as local to, this module. The method may end at step 1212.

In embodiments, the identity services provided by the integrated identity system 24 may be performed by invoking one more contracts published to the blockchain of the distributed identity element repository. FIGS. 13-16 depict embodiments of contract architectures published to the blockchain to implement identity services of the integrated identity system.

Figure 13:
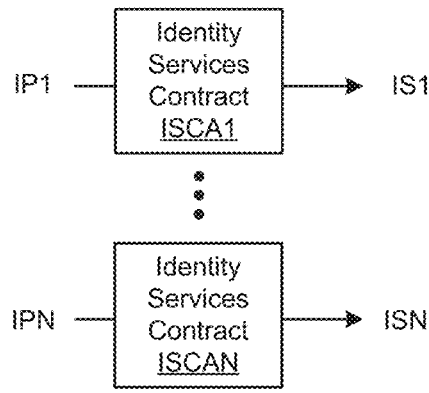
FIG. 13 is a schematic diagram depicting an embodiment of an architecture of identity services contracts.

The integrated identity system 24 may provide identity services to a plurality of different identity service providers or differently authorized roles within a single identity service provider. FIG. 13 depicts an embodiment of an identity services contract architecture implementing identity services for the plurality of different identity service providers or differently authorized roles IP1-IPN. The architecture may include a plurality of identity services contracts ISCA1-ISCAN, each accepting input only from a different identity provider or authorized role IP1-IPN, and providing identity services IS1-ISN for only that identity provider or authorized role.

Figure 14:
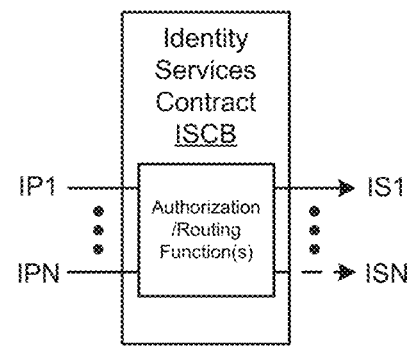
FIG. 14 is a schematic diagram depicting another embodiment of an architecture of identity services contracts.

FIG. 14 depicts another embodiment of an identity services contract architecture implementing identity services for the plurality of different identity service providers or authorized roles. The architecture may include a single identity services contract ISCB that accepts requests for identity services from the plurality of different identity providers or authorized roles IP1-IPN, and provides identity services IS1-ISN for each of the identity providers or authorized roles IP1-IPN. The contract may include one or more authorization or routing functions that identifies a requestor of the identity services and authorizes or routes the request to create, modify, etc. identities, metadata structures, etc. only associated with the identified requestor. For purposes of performing the authorization or routing, the transaction addressed to the identity services contract ISCB may include an indication of the requestor.

Figure 15:
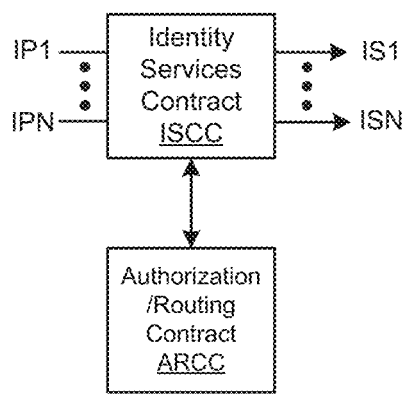
FIG. 15 is a schematic diagram depicting another embodiment of an architecture of identity services contracts.

FIG. 15 depicts another embodiment of an identity services contract architecture implementing identity services for the plurality of different identity service providers or authorized roles. The architecture may include an identity services contract ISCC that accepts request for identity services from the plurality of different identity providers or authorized roles IP1-IPN, and a separate authorization or routing contract ARCC that identifies a requestor of the identity services and provides an authorization or routing of the request to create, modify, etc. identities, metadata structures, etc. only associated with the identified requestor. The identity services contract ISCC may generate a transaction addressed to the authorization or routing contract ARCC to request an authorization or routing in response to a transaction addressed to the identity services contract requesting the identity services.

Figure 16:
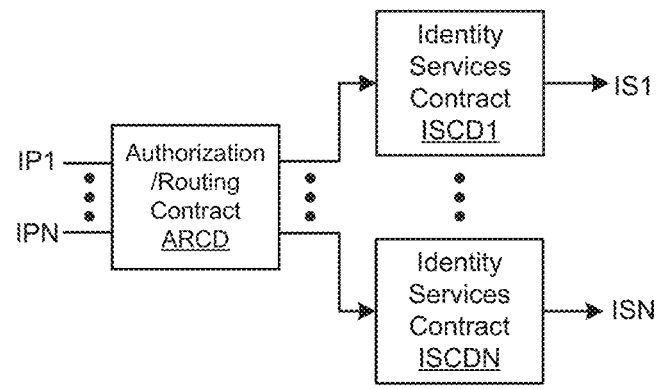
FIG. 16 is a schematic diagram depicting another embodiment of an architecture of identity services contracts.

FIG. 16 depicts another embodiment of an identity services contract architecture implementing identity services for the plurality of different identity service providers or authorized roles. The architecture may include an authorization or routing contract ARCD that accepts requests for identity services from the plurality of different identity providers or authorized roles IP1-IPN, identifies a requestor of the identity services and provides an authorization or routing of the request to create, modify, etc. identities, metadata structures, etc. associated with the identified requestor to a respective identity services contract ISCD1-ISCDN, and one or more identity services contracts ISCD1-ISCDN, each performing identity services for a different respective identity provider or authorized role. The authorization or routing contract ARCD may generate a transaction addressed to the corresponding identity services contract ISCD1-ISCDN in response to a transaction requesting the identity services upon performing the authorization or routing.

Embodiments of the architecture of FIG. 16 also may be configured to include only a single identity services contract to separate authorization features from identity service features even for only a single identity provider or authorized role.

The integrated identity system may provide one or more identity verification functions to enable verification of an identity an improved manner to enable increased security and identity fraud prevention. In embodiments, a multifactor identity verification process, which may include verifying the identity in the integrated identity system and performing a physical verification of the individual presenting the identity token, may be performed.

Figure 17:
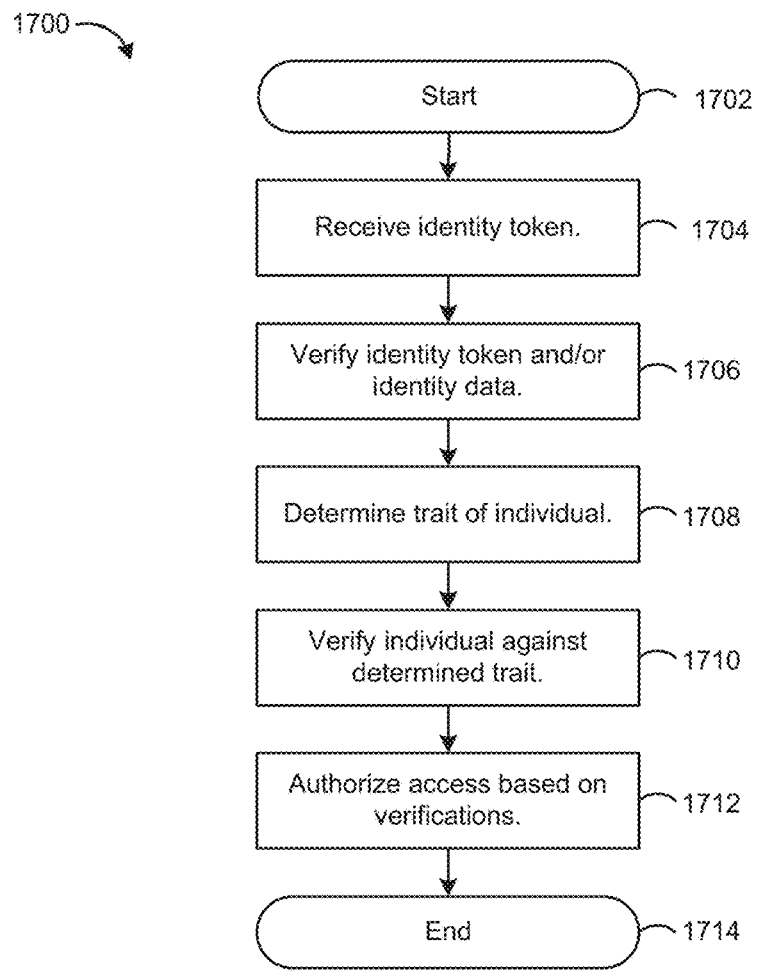
FIG. 17 is a flowchart depicting an embodiment of a method of verifying an identity of an individual.

FIG. 17 depicts an embodiment of a method 1700 of performing a verification of an identity of an individual. The method may perform a multifactor identity verification, including a verification of the identity stored in the identity element repository in the integrated identity system and a physical verification of the individual presenting the identity token. Embodiments of the method 1700 may be used to implement the identity verification step 516 of the method 500 of FIG. 5. The method may begin at step 1702.

Note that embodiments of the identity services methods discussed herein may be performed in many different contexts. In one example, identity verification may be performed in the context of a hotel customer seeking to rent a room and/or otherwise access systems of a hotel. Identity verification also may be performed in many other contexts.

At step 1704 presentation of an identity token may be received by the restricted access system 36 from an individual seeking to invoke the identity to access the restricted access system 36. Presentation of the identity token may be received by the restricted access system 36 in a variety of ways, such as by the restricted access system scanning the identity token displayed by the individual using the identity user system. For example, a hotel customer may present an identity token in the form of barcode to a hotel system using a mobile device displaying the bar code.

At step 1706, the identity token and the corresponding identity within the integrated identity system may be verified. The identity token may be verified to ensure its integrity. Verifying the identity token may include verifying a digital signature component of the identity token against a public key of the identity provider, such as discussed further below in regard to FIG. 19. The identity associated with the identity token may be verified to provide a first factor of the multifactor identity verification. The identity verification may include determining whether the identifier associated with the identity is stored on the blockchain, such as by searching the blockchain for the identifier or invoking an identity data verification function of the identity services contract, e.g., as discussed further below in regard to FIG. 19.

At step 1708 a physical trait of the individual may be determined. In embodiments the physical trait associated with the individual, such as a representation of a biometric identity data of the individual, may be determined from the identity token. For example, physical trait may be determined as data extracted from the identity token. The physical trait may include one or more of a picture of the individual, a representation of a fingerprint of the individual, a representation of a facial pattern of the individual, a representation of an iris pattern of the individual, a representation of a retina pattern of the individual, a representation of a voice of the individual, a representation of a deoxyribonucleic acid (DNA) pattern of the individual, etc. In other embodiments the physical trait may be determined as a function of data from the identity token or using other systems.

At step 1710, the determined physical trait may be verified against the individual presenting the identity token to invoke the identity. The physical trait may be verified against the individual presenting the identity token to provide a second factor of the multifactor identity verification. The physical trait may be verified against the individual using a variety of methods, including one or more of visual comparison by personnel of the third party operating the restricted access system, automated comparison by a biometric feature scanning and comparison apparatus, etc. For example, a biometric feature scanning and comparison apparatus may include a scanning device to scan a biometric feature of the individual corresponding to the physical trait, and a processing device to compare the scanned feature to the physical trait.

At step 1712, access to the restricted access system may be authorized or denied as a function of the results of the verification of the identity and the verification of the extracted data. Access may be authorized if the result of both verifications is positive, that is, if the result of the identity verification indicates that the identity is valid, and the result of the physical verification indicates that the individual corresponds to the identity. Access may be denied if the result of either verification is negative, that is, if the result of the identity verification indicates that the identity is invalid, or the result of the physical verification indicates that the individual does not correspond to the identity. The method may end at step 1714.

Figure 18:
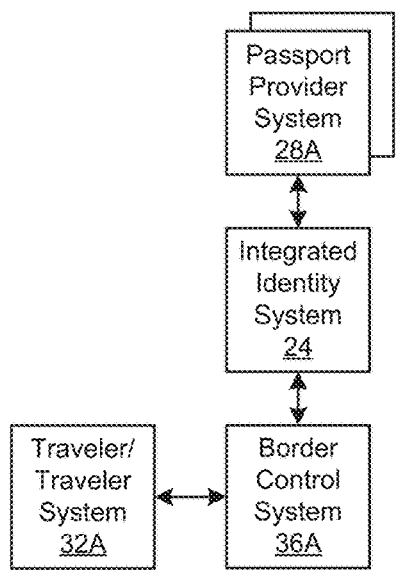
FIG. 18 is a schematic diagram depicting an embodiment of a system to provide identity services in the context of governmental identity checking.

As indicated above, embodiments of methods of verifying the identity of an individual may be conducted in various contexts. FIG. 18 depicts an exemplary embodiment of the system of FIG. 1 in the context of a governmental border crossing or identity checking station. The system may include the identity integration system 24, one or more passport or governmental identity provider systems 28A as an embodiment of the identity provider system 28, a traveler or citizen identity user system 32A as an embodiment of the identity user system 32, and a border control or identity checking system 36A as an embodiment of the restricted access system 36.

In other embodiments, an identity verification may be performed using only a single factor of the multifactor identity verification of FIG. 17. For example, an embodiment of a method of performing an identity verification may include only a verification of the identity within the integrated identity system, such as only steps 1704, 1706, and authorization step similar to step 1712, but in which access may be authorized if the result of the single verification factor is positive and be denied if the result is negative, of the steps depicted in FIG. 17.

Figure 19:
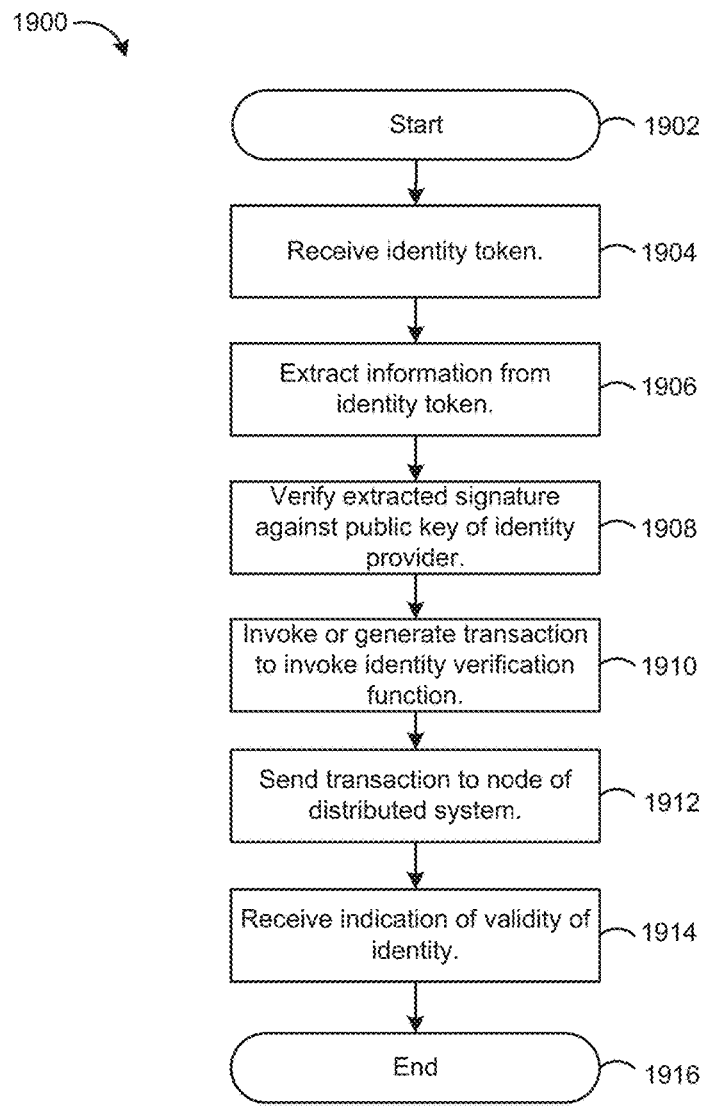
FIG. 19 is a flowchart depicting another embodiment of a method of verifying an identity of an individual.

Verifying the identity within the integrated identity system may include invoking a function to verify the identifier representing the identity within the identity element repository. FIG. 19 depicts an embodiment of the method 1900 of verifying an identity of an individual stored in the identity element repository in the integrated identity system 24. In embodiments in which the identity element repository includes a distributed system, such as a distributed blockchain ledger or distributed smart contract system, embodiments of the method 1900 may be used to implement the identity verifying process of steps 1704 and 1706 of the method 1700 of FIG. 17. The method may begin at step 1902.

At step 1904 the identity token may be received by the restricted access system 36 from an individual seeking to invoke the identity to access a restricted access system 36.

At step 1906, one or more components of the identity token may be extracted. The extracted components may include one or more of the identifier of the identity, the digital signature of the identity provider, the indication of the identity of the identity provider, etc. In embodiments in which the identity token includes encoded data, the information may be extracted by decoding any encoding of the information in the identity token. For example, if the identity token encodes the contained information in a two dimensional bar code, the information may be extracted by decoding the bar code.

At step 1908, a digital signature included in the identity token may be verified. The digital signature may be a cryptographic hash of the identity token using a private key, such as a private key of the identity provider. Verifying the digital signature may verify the integrity of the identity token. The digital signature may be verified using a public key, such as a public key of the identity provider. In embodiments, the identity of the identity provider and/or the public key of identity provider may be determined from one or more extracted components of the identity token.

At step 1910, it may be determined whether a blockchain of the identity element repository contains a data structure having the identifier of the identity, such as by searching the data structures of the blockchain, invoking an identity verification function 112 of the identity services contract, or generating one or more transactions to invoke the identity verification function of the identity services contract. In embodiments, the identity verification function may be a public function of the identity services contract that may be accessed and executed without generating a transaction to the blockchain. In such embodiments, the identity verification function may be directly invoked. Alternatively, in embodiments invoking the identity verification function may require a transaction to the blockchain. In such embodiments, to invoke the identity data verification function, a transaction including a call to invoke the function may be generated. The call to the identity verification function may include as an input to the function the representation of the validated identity data of the identity stored on the blockchain, such as the validated identity data cryptographically encoded using one or more hash functions.

In embodiments in which a transaction is generated, at step 1912, the generated transaction may be transmitted to at least one of the distributed system nodes 68 of the distributed identity element repository. The transaction may be sent to the at least one node 68 by one of the distributed system nodes 68 directly connected to, such as local to, the identity verification module 60 of the integrated identity system 24. As with other steps of sending the transactions to at least one distributed system node 66, sending the transaction may trigger the transaction to be included in a process by one or more of the distributed system nodes 66 to incorporate the transaction into a block of the blockchain stored by nodes 66 of the distributed identity element repository. Once incorporated into a block, the transaction has been executed, such as resulting in invoking the identity verification function. In embodiments in which a transaction need not be generated, such as in which the identity verification function may be directly invoked, step 1912 may be omitted.

At step 1914, a verification and/or status of the identity in the distributed identity element repository may be received. A result of step 1910 may include whether the identifier representing the identity data input to the function call exists on the blockchain. If the identifier representing the identity data does not exist on the blockchain, the function may return that identity is invalid. If the identifier does exist on the blockchain, the function may return an indication of the validity of the identity. A current status of the identity also may be retrieved, such as by accessing metadata on the blockchain associated with the identity. The method may end at step 1916.

Figure 20:
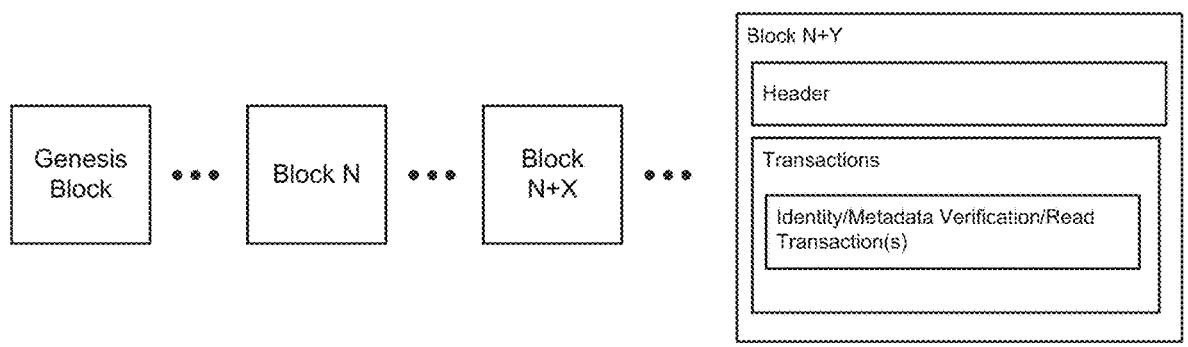
FIG. 20 is a schematic diagram depicting an embodiment of the blockchain of the distributed identity element repository after incorporation of a transaction verifying an identity into the blockchain.

FIG. 20 depicts an embodiment of a blockchain of the distributed identity element repository after incorporation of a transaction to invoke the identity data verification function of the identity services contract into the blockchain. The blockchain may include the portion of the blockchain depicted in FIG. 11, followed by a subsequent portion leading to a block, such as an N+Yth block, that may incorporate the transaction invoking the identity verification function, although in other embodiments any subsequent block may incorporate the transaction.

FIGS. 21A-21C depict embodiments of a user interface 150 provided to the restricted access system 36 by the restricted access system interface module 48. FIG. 21A depicts an embodiment of the user interface 150 prior to receipt of the identity token. The user interface 150 may include a plurality of fields 154 and corresponding identifiers to accept different types of data. In FIG. 21A, the user interface 150 may include fields to accept information extracted from an identity token. FIG. 21B depicts an embodiment of the user interface 150 after population by information extracted from the identity token. FIG. 21C depicts an embodiment of the user interface 150 after execution of the identity verification function. The user interface 150 may display the validated identity data 158, the validity of the identity 161, the status of the identity 162, and an identification of the identity provider 166.

Figure 22:
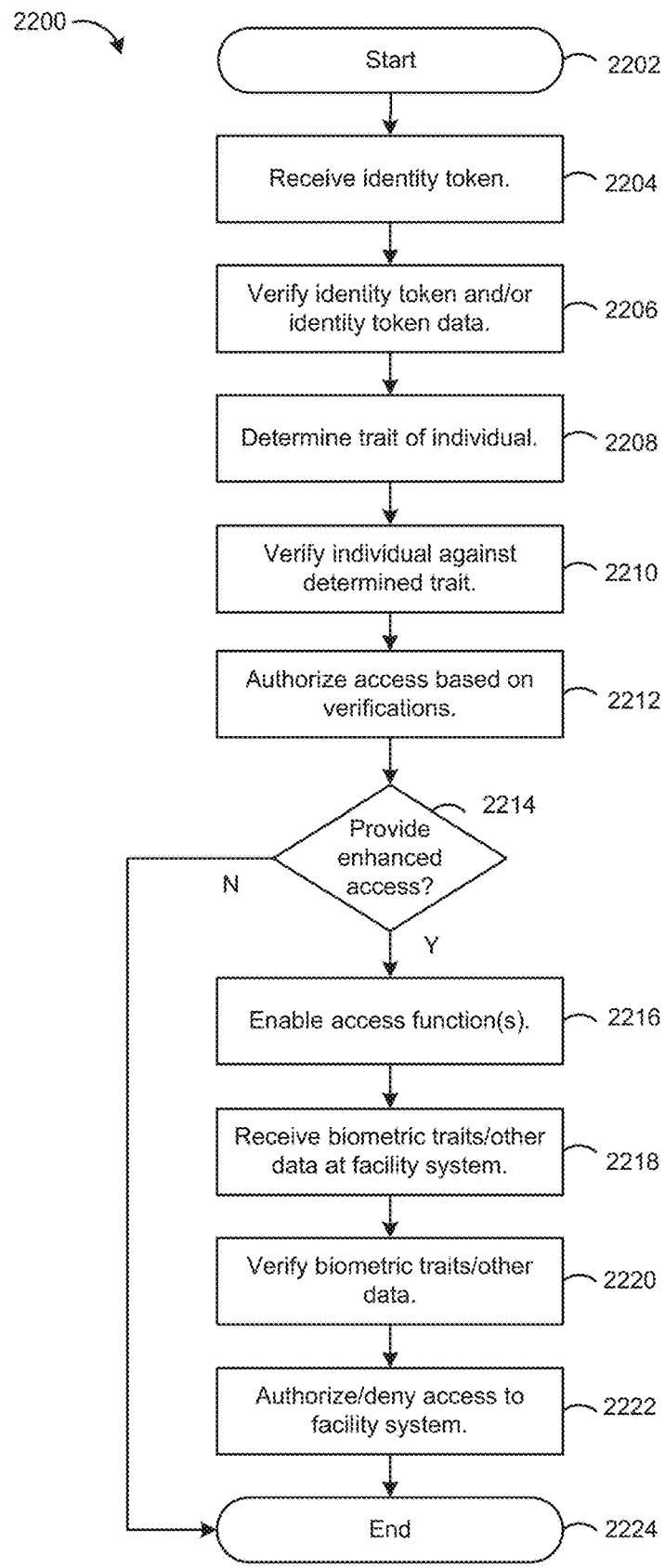
FIG. 22 is a flowchart depicting another embodiment of a method of verifying an identity of an individual.

A multiphase identity verification process also may be provided. Embodiments of a multiphase verification process may include an initial, relatively more rigorous verification phase, and a subsequent, relatively less rigorous verification phase. FIG. 22 depicts an embodiment of a method 2200 of verifying an identity of an individual seeking to access a restricted access system 36. The method 2200 may provide a multiphase verification, including an initial, relatively more rigorous phase, such as including embodiments of a multifactor verification, such as discussed above, and, an authorization having been provided in response to the initial verification, a subsequent second, relatively less rigorous verification, such as limited to a single factor verification. Embodiments of the method 2200 may be used to implement the identity verification step 516 of the method 500 of FIG. 5. The method may begin at step 2202.

At step 2204, presentation of the identity token may be received by the restricted access system 36 from an individual seeking to invoke the identity to access the restricted access system 36. Step 2204 may be performed similarly to as discussed above in regard to steps 1704 and 1904 of methods 1700 and 1900 of FIGS. 17 and 19.

At step 2206, the identity token and corresponding identity within the integrated identity system may be verified. As discussed above, verifying the identity token may ensure its integrity, and verifying the identity within the integrated identity system may provide a first factor of a multifactor identity verification. Step 2206 may be performed similarly to as discussed above in regard to step 1706 of method 1700 of FIG. 17 and method 1900 of FIG. 19.

At step 2208, a physical trait of the individual may be determined, such as a representation of a biometric trait of the individual extracted from the identity token or determined otherwise. Step 2208 may be performed similarly to as discussed above in regard to step 1708 of method 1700 of FIG. 17.

At step 2210, the physical trait may be verified against the individual presenting the identity token to invoke the identity. As discussed above, the physical trait may be verified against the individual presenting the identity token to provide a second factor of the multifactor identity verification. Step 2210 may be performed similarly to as discussed above in regard to step 1710 of method 1700 of FIG. 17.

At step 2212, an initial access to the restricted access system may be authorized or denied as a function of the results of the verification of the identity and the verification of the extracted representation of the biometric trait. Access may be authorized if the result of both verifications is positive, and access may be denied if the result of either verification is negative. Step 2212 may be performed similarly to as discussed above in regard to step 1712 of method 1700 of FIG. 17.

Embodiments of the method 2200 of FIG. 22 may be performed to provide a multiphase verification in a variety of contexts. For example, embodiments of the method may be utilized where an operator of a facility, such as, e.g., a hotel, a convention center, a business premises, a service provider premises, an employment premises, etc., may require or desire an initial more rigorous verification at a first interaction with the individual, but then may be comfortable with or desire to provide the convenience of a less rigorous verification at subsequent interactions.

Figure 23:
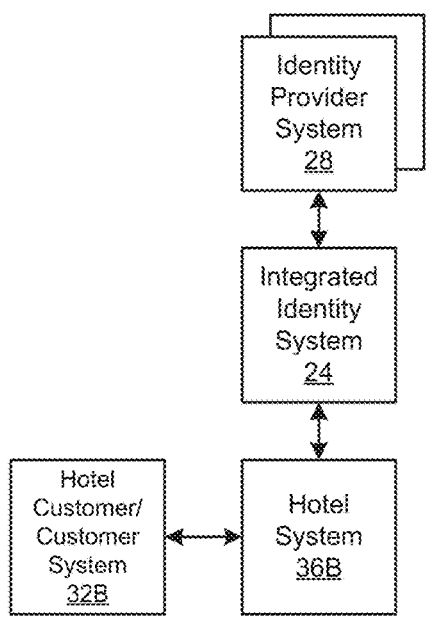
FIG. 23 is a schematic diagram depicting an embodiment of a system to provide identity services in the context of a hotel.

FIG. 23 depicts an embodiment of the system of FIG. 1 configured for the context of a hotel. The system may include the identity integration system 24, one or more identity provider systems 28, a hotel customer or hotel customer system 32B as an embodiment of the identity user system 32, and a hotel system 36B as an embodiment of the restricted access system 36. Embodiments of the method 2200 of FIG. 22 may provide multiphase verification in the context of a system including a hotel facility restricted access system such as in FIG. 23. In such a context, the initial, more rigorous verification process may be performed at an initial interaction of the hotel customer with the hotel system, such as during a check-in process of the hotel customer at the hotel.

Returning to FIG. 22, at step 2214 a determination of whether to provide a multiphase verification process to the individual may be made. If it is determined to provide a multiphase verification process, also referred to herein as an enhanced verification process, the method may proceed to step 2216, otherwise the method may proceed to step 2224, where the method may end. The determination may be made by the restricted access system operator or a component of the restricted access system 36. The determination may be made based on one or more factors, such as one or more of a predetermined arrangement between the restricted access system and the individual (e.g., a frequent user program, etc.), assigning predetermined categories of individuals to enhanced verification or non-enhanced verification (e.g., assigning individuals of certain jurisdictions to enhance or non-enhanced verification, etc.), whether any issues arose during the initial verification phase, a perceived level of trust associated with the individual, etc.

At step 2216, enhanced verification for the individual may be enabled for the restricted access system 36. Enhanced verification may be enabled by, for example, setting an indication in a profile for the individual in the restricted access system 36.

At step 2218, data related to the individual, such as a representation of a biometric feature of the individual, may be received by the restricted access system subsequent to the initial verification phase. A biometric feature may be received via a scanning of the biometric feature by the restricted access system. A biometric feature scanning apparatus may include a scanning device to scan the biometric feature of the individual corresponding to a determined physical trait. In one example, a thumbprint scanner may scan a thumbprint of the individual.

At step 2220, the determined physical trait may be verified against the received biometric data. The physical trait may be verified against the received biometric data to provide the subsequent, relatively less rigorous verification of the enhanced verification process. Step 2220 may be performed similarly to as discussed above in regard to corresponding elements step 1710 of method 1700 of FIG. 17. In one example, determined thumbprint data may be compared to a scanned thumbprint.

At step 2212, a subsequent access to the restricted access system 36 may be authorized or denied as a function of the results of the verification of the physical trait against the received biometric data. Access may be authorized if the result of the verification is positive, that is, if the result of the verification indicates that the individual corresponds to the extracted trait. Access may be denied if the result of the verification is negative, that is, if the result of the verification indicates that the individual does not correspond to the extracted trait. The method may end at step 1714.

Returning to FIG. 23, in embodiments of the method 2200 conducted in the context of the hotel restricted access system, the subsequent, less rigorous verification phase may be performed at a subsequent interaction of the hotel customer with the hotel system, such as when the hotel customer accesses their room at the hotel.

In embodiments of the method 2200 of FIG. 22, the subsequent verification phase may be based on verification of other data instead of or in addition to verification of a determined physical trait, such as verification of a piece of identity data, etc.

Metadata stored in the identity element repository in association with the identity may be retrieved. For example, a current status of the identity, such as whether the identity has been revoked, whether an arrest request issued for the individual, etc., stored in the metadata may be retrieved during embodiments of identity verification processes at the same time as the validity of the identity is verified.

Figure 24:
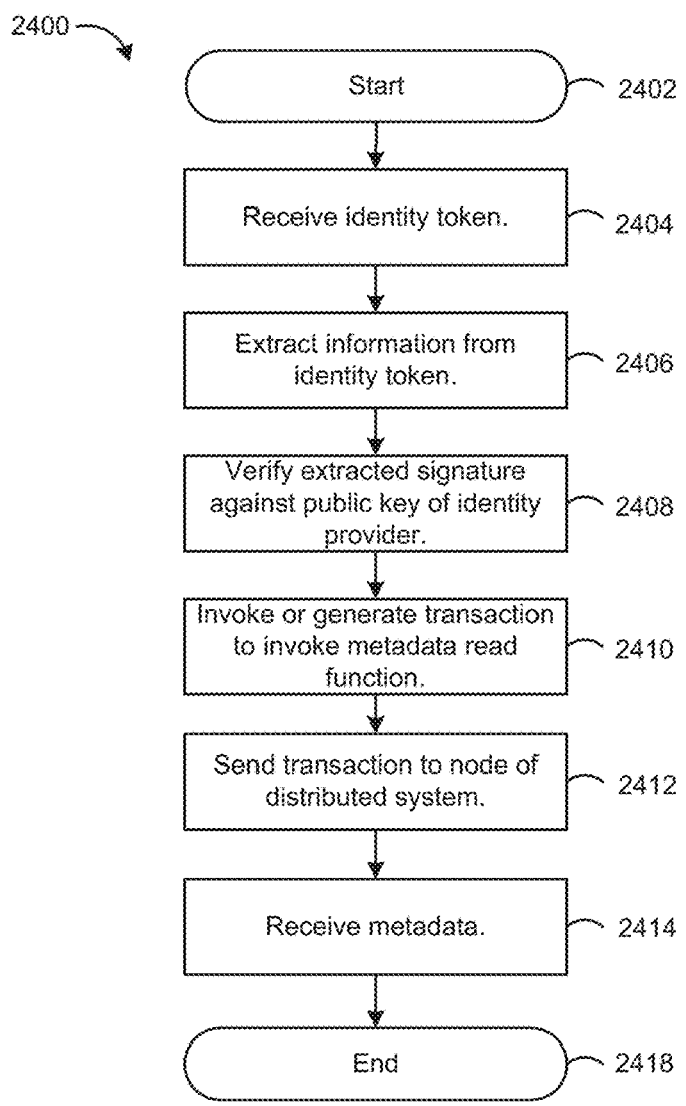
FIG. 24 is a flowchart depicting an embodiment of a method of reading metadata associated with an identity in the integrated identity system.

FIG. 24 depicts an embodiment of a method 2400 of retrieving metadata associated with an identity in the integrated identity system. In embodiments in which the identity element repository includes a distributed system, embodiments of the method 2400 may be used to implement the retrieving of metadata associated with an identity within the identity element repository of step 520 of the method 500 of FIG. 5. The method may begin at step 2402.

At step 2404, presentation of the the identity token may be received by the restricted access system from an individual seeking to invoke the identity to access the restricted access system. Step 2404 may be performed similarly to as discussed above in regard to step 1904 of method 1900 of FIG. 19.

At step 2406, one or more identity token components may be extracted from the identity token. The extracted information may include the identifier representing the validated identity data of the identity stored on the blockchain. Step 2406 may be performed similarly to as discussed above in regard to step 1906 of method 1900 of FIG. 19.

At step 2408, a digital signature of the identity token may be verified. Step 2408 may be performed similarly to as discussed above in regard to step 1908 of method 1900 of FIG. 19.

At step 2410, it may be determined whether the blockchain contains metadata structures associated with the identifier, such as by searching the data structures of the blockchain, invoking a metadata read function 116 of the identity services contract, or generating one or more transactions to invoke the metadata read function of the identity services contract. The metadata read function may be a public function of the identity services contract that may be accessed and executed without generating a transaction to the blockchain. In such embodiments, the metadata read function may be directly invoked. Alternatively, invoking the metadata read function may require a transaction to the blockchain. In such embodiments, to invoke the metadata read function, a transaction including a call to invoke the function may be generated. The call to the metadata read function may include as an input to the function the representation of the validated identity data of the identity stored on the blockchain.

In embodiments in which a transaction is generated, at step 2412, the generated transaction may be transmitted to at least one of the distributed system nodes 66 of the distributed identity element repository. The transaction may be sent to the at least one node by one of the distributed system nodes 66 directly connected to, such as local to, the modules of the integrated identity system 24. As with other steps of sending the transactions to at least one distributed system node 66, sending the transaction may trigger the transaction to be included in a process by one or more of the distributed system nodes 66 to incorporate the transaction into a block of the blockchain stored by nodes 66 of the distributed identity element repository. Once incorporated into a block, the transaction has been executed, such as by invoking the metadata read function. In embodiments in which a transaction need not be generated, such as in which the metadata read function may be directly invoked, step 2412 may be omitted.

At step 2414, the metadata associated with the identity in the distributed identity element repository may be received.

Figure 25:
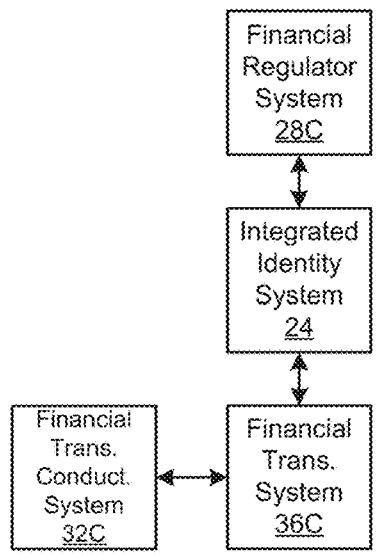
FIG. 25 is a schematic diagram depicting an embodiment of a system to provide identity services in the context of a financial transaction environment.

The integrated identity system 24 may provide identity services in many further contexts. For example, integrated identity system 24 may provide identity services to enable financial transaction regulatory and tracking processes. FIG. 25 depicts an embodiment of the system of FIG. 1 configured for the context of a financial transaction environment. The system may include the identity integration system 24, one or more identity provider systems 28 such as, e.g., a financial regulator identity provider system 28C, a financial transaction conductor system 32C as an embodiment of the identity user system 32, and a financial transaction system 36C as an embodiment of the restricted access system 36.

Figure 26:
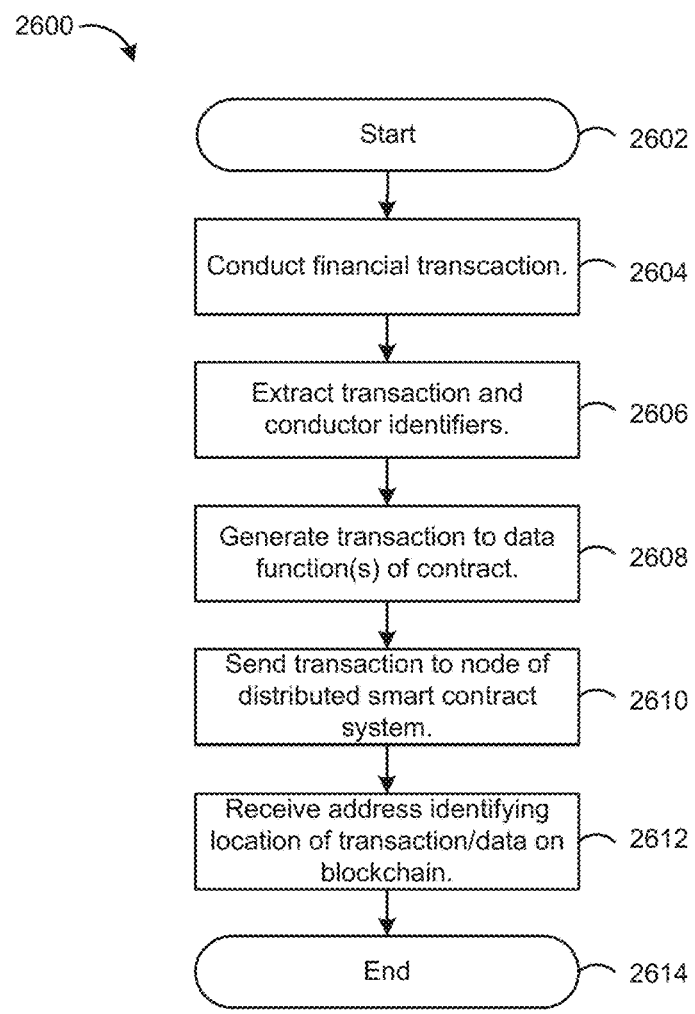
FIG. 26 is a flowchart depicting an embodiment of providing financial transaction identity services.

FIG. 26 depicts an embodiment of a method 2600 of tracking financial transactions. Embodiments of the method may be conducted in the context of embodiments of a financial transaction environment, such as embodiments of the system of FIG. 25. The method may begin at step 2602.

At step 2604, a financial transaction may be conducted. The financial transaction may include one or more of financial trade, such as a stock, bond or other trade; a debt obligation transaction, such as a loan transaction; an asset transfer transaction; etc. The financial transaction may be conducted by the financial transaction conductor using the financial transaction system.

At step 2606, financial transaction and financial transaction conductor identifiers may be extracted from a record of the financial transaction or other data set. For example, the identifiers may be extracted from a receipt or log generated in response to the transaction.

At step 2608, a transaction to invoke a data or metadata creation or modification function of an identity services contract may be generated. The transaction may be generated similarly to as discussed above in regard to other blockchain transaction generation steps. The transaction may add metadata including the financial transaction identifier to the identity element repository in association with an identity identified by the financial transaction conductor identifier. The financial transaction conductor identifier may include the representation of validated identify data for the financial transaction conductor.

At step 2610, the transaction to invoke a data or metadata creation or modification function of an identity services contract may be sent to at least one distributed smart contract system node of the distributed identity element repository. The transaction may be sent to the at least one node similarly to as discussed above in regard to other blockchain transaction sending steps, and may similarly result in the transaction being incorporated into the blockchain.

At step 2612, an addresses identifying the location on the blockchain at which the transaction has been incorporated. The incorporation of the transaction on the blockchain may provide a relatively indelible record of the financial transaction being conducted by the financial transaction conductor, such as may satisfy one or more financial regulations.

Additional embodiments of the identity system, integrated identity system, and methods of providing identity services discussed herein are possible. For example, any feature of any of the embodiments of the identity system, integrated identity system, and methods of providing identity services described herein may be used in any other embodiment of the identity system, integrated identity system, and methods of providing identity services. Also, embodiments of the identity system, integrated identity system, and methods of providing identity services may include only any subset of the components or features of the identity system, integrated identity system, or methods of providing identity services discussed herein.

What is claimed is:

1. A method of verifying an identity, the method comprising:
    generating, by an identity system, an identity token incorporating an identifier representing identity data of an identity generated for an individual by an identity provider, the incorporated identifier being stored in a data structure associated with program instructions of a smart contract of a distributed ledger system, the data structure and the program instructions of the smart contract being stored in a blockchain of the distributed ledger system:
    providing, by the identity system at an interface of the identity system to a user system of the individual, the generated identity token to the user system:
    receiving, by the identity system at an interface of the identity system to a restricted access system, data extracted from an identity token received by the restricted access system from the user system;
    determining, by invoking by the identity system execution of the program instructions of the smart contract by a processor of the distributed ledger system, wherein the program instructions of the smart contract comprise an identity verification function, whether at least a portion of the extracted data matches the identifier stored in the data structure of the smart contract in the blockchain of the distributed ledger system; and
    outputting, by the identity system at the interface to the restricted access system, an indication of a validity of the identity generated by the identify provider based on the determination.

2. The method of claim 1, wherein the identifier representing the identity data includes a cryptographic hash of the identity data.

3. The method of claim 1, wherein the determining includes providing the identifier representing the identity data as an input to the identity verification function of the smart contract.

4. The method of claim 1, wherein the identify verification function returns the indication of the validity of the identity associated with the identity data.

5. The method of claim 1, wherein the determining determines that the identifier does not exist on the blockchain, and the indication indicates that the identity associated with the identity data is invalid.

6. The method of claim 1, wherein the determining determines that the identifier does exist on the blockchain, and the indication indicates that the identity associated with the identity data is valid.

7. The method of claim 6, wherein the indication further indicates a current status of the identity.

8. The method of claim 7, wherein the current status includes at least one of: an indication of whether the identity has been revoked, or an indication of an expiration date of the identity.

9. The method of claim 1, wherein the identity data includes at least one of: a name of the individual, an identification number of the identity of the individual, or an address of the individual.

10. The method of claim 1, wherein the identity data includes at least one representation of a biometric trait of an individual.

11. The method of claim 10, wherein the representation of the biometric trait includes at least one of: a picture of the individual, a fingerprint of the individual, a facial pattern of the individual, an iris pattern of the individual, a retina pattern of the individual, a representation of a voice of the individual, or a deoxyribonucleic acid (DNA) pattern of the individual.

12. The method of claim 1, wherein the identity data is validated by an identity provider that provides the identity.

13. The method of claim 1, wherein the identity token includes, in addition to the identifier, at least one of: an identification of the identity provider, or a digital signature of the identity provider.

14. The method of claim 1, wherein the data extracted from the identity token further includes a digital signature of the identity provider, and the method further comprises verifying the digital signature using a public key of the identity provider.

15. The method of claim 1, further comprising receiving, by the identity system at a second interface from an identity provider system, the identity data.

16. The method of claim 1, further comprising storing, by the identity system, the identifier representing the identity data on the blockchain.

17. The method of claim 1, wherein when the data structure containing the extracted identifier is stored on the blockchain, the indication includes that the identity is valid, and when the data structure containing the extracted identifier is not stored on the blockchain, the indication includes that the identity is invalid.

18. At least one non-transitory, machine-readable storage medium having program instructions, which when executed by at least one processor causes a method of providing identity services to be performed, the method comprising:
generating, by an identity system, an identity token incorporating an identifier representing identity data of an identity generated for an individual by an identity provider, the incorporated identifier being stored in a data structure associated with program instructions of a smart contract of a distributed ledger system, the data structure and the program instructions of the smart contract being stored in a blockchain of the distributed ledger system:
providing, by the identity system at an interface of the identity system to a user system of the individual, the generated identity token to the user system:
receiving, by the identity system at an interface of the identity system to a restricted access system, data extracted from an identity token received by the restricted access system from the user system;
determining, by invoking by the identity system execution of the program instructions of the smart contract by a processor of the distributed ledger system, wherein the program instructions of the smart contract comprise an identity verification function, whether at least a portion of the extracted data matches the identifier stored in the data structure of the smart contract in the blockchain of the distributed ledger system; and
outputting, by the identity system at the interface to the restricted access system, an indication of a validity of the identity generated by the identify provider based on the determination.

19. The non-transitory machine readable storage medium of claim 18, wherein the identifier representing the identity data includes a cryptographic hash of the identity data.

20. A system, comprising:
at least one processor;
at least one non-transitory, machine-readable storage medium having program instructions, which when executed by the at least one processor cause a method of providing identity services to be performed, the method comprising:
generating, by an identity system, an identity token incorporating an identifier representing identity data of an identity generated for an individual by an identity provider, the incorporated identifier being stored in a data structure associated with program instructions of a smart contract of a distributed ledger system, the data structure and the program instructions of the smart contract being stored in a blockchain of the distributed ledger system:
providing, by the identity system at an interface of the identity system to a user system of the individual, the generated identity token to the user system:
receiving, by the identity system at an interface of the identity system to a restricted access system, data extracted from an identity token received by the restricted access system from the user system;
determining, by invoking by the identity system execution of the program instructions of the smart contract by a processor of the distributed ledger system, wherein the program instructions of the smart contract comprise an identity verification function, whether at least a portion of the extracted data matches the identifier stored in the data structure of the smart contract in the blockchain of the distributed ledger system; and
outputting, by the identity system at the interface to the restricted access system, an indication of a validity of the identity generated by the identify provider based on the determination.

21. The system of claim 20, wherein the identifier representing the identity data includes a cryptographic hash of the identity data.

22. A method of verifying an identity, the method comprising:
generating, by an identity system, an identity token incorporating an identifier representing identity data of an identity generated for an individual by an identity provider, the incorporated identifier being stored in a data structure associated with program instructions of a smart contract of a distributed ledger system, the data structure and the program instructions of the smart contract being stored in a distributed ledger of the distributed ledger system:
providing, by the identity system at an interface of the identity system to a user system of the individual, the generated identity token to the user system:

receiving, by the identity system at an interface of the identity system to a restricted access system, data extracted from an identity token received by the restricted access system from the user system;

determining, by invoking by the identity system execution of the program instructions of the smart contract by a processor of the distributed ledger system, wherein the program instructions of the smart contract comprise an identity verification function, whether at least a portion of the extracted data matches the identifier stored in the data structure of the smart contract in the distributed ledger of the distributed ledger system; and outputting, by the identity system at the interface to the restricted access system, an indication of a validity of the identity generated by the identify provider based on the determination, wherein the indication indicates a current status of the identity, the current status including at least one of: an indication of whether the identity has been revoked, or an indication of an expiration date of the identity.

23. The method of claim 22, wherein when the data structure containing the extracted identifier is stored on the distributed ledger, the indication includes that the identity is valid, and when the data structure containing the extracted identifier is not stored on the distributed ledger, the indication includes that the identity is invalid.

* * * * *